(12) United States Patent
Ko et al.

(10) Patent No.: US 11,114,965 B2
(45) Date of Patent: Sep. 7, 2021

(54) MOTOR CONTROL MODULE, MOTOR CONTROL DEVICE, MOTOR CONTROL SYSTEM, AND MOTOR CONTROL METHOD

(71) Applicant: LG ELECTRONICS INC., Seoul (KR)

(72) Inventors: Hyojin Ko, Seoul (KR); Seungsuk Oh, Seoul (KR); Hyounguk Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 16/498,159

(22) PCT Filed: Mar. 8, 2018

(86) PCT No.: PCT/KR2018/002769
§ 371 (c)(1),
(2) Date: Sep. 26, 2019

(87) PCT Pub. No.: WO2018/182196
PCT Pub. Date: Oct. 4, 2018

(65) Prior Publication Data
US 2021/0104967 A1    Apr. 8, 2021

(30) Foreign Application Priority Data

Mar. 28, 2017  (KR) .................. 10-2017-0039417

(51) Int. Cl.
*H02P 21/22* (2016.01)
*H02P 21/18* (2016.01)
(Continued)

(52) U.S. Cl.
CPC .............. *H02P 21/22* (2016.02); *H02P 21/12* (2013.01); *H02P 21/141* (2013.01); *H02P 21/18* (2016.02);
(Continued)

(58) Field of Classification Search
CPC .................................. H02P 21/22; H02P 21/18
(Continued)

(56) References Cited

U.S. PATENT DOCUMENTS 7,075,266 B2 * 7/2006 Tobari ..................... H02P 21/06
318/255
8,327,670 B2 * 12/2012 Maekawa .............. H02K 21/04
68/12.02
(Continued)

FOREIGN PATENT DOCUMENTS

JP   2012-223021   11/2012
KR   10-2006-0009198   1/2006
(Continued)

OTHER PUBLICATIONS

International Search Report (with English Translation) dated May 31, 2018 issued in Application No. PCT/KR2018/002769.
(Continued)

*Primary Examiner* — David Luo
(74) *Attorney, Agent, or Firm* — Ked & Associates, LLP

(57) ABSTRACT

The present specification relates to a motor control module, a motor control device, a motor control system, and a motor control method, and the purpose of the present specification is to provide a motor control module, a motor control device, a motor control system, and a motor control method, which control driving current applied to a motor according to an operating condition of a variable magnetic motor so as to enable magnetic force in the motor to be controlled.

19 Claims, 10 Drawing Sheets

(51) Int. Cl.
*H02P 21/26* (2016.01)
*H02P 21/12* (2016.01)
*H02P 21/14* (2016.01)
*H02P 27/06* (2006.01)

(52) U.S. Cl.
CPC .............. *H02P 21/26* (2016.02); *H02P 27/06* (2013.01); *H02K 2213/03* (2013.01)

(58) Field of Classification Search
USPC ................................ 318/400.02, 400.01, 700
See application file for complete search history.

(56) References Cited

U.S. PATENT DOCUMENTS

| | | | |
|---|---|---|---|
| 8,896,252 B2* | 11/2014 | Yamada | ................ H02P 23/009 318/494 |
| 2010/0090640 A1 | 4/2010 | Maekawa et al. | |
| 2010/0139333 A1 | 6/2010 | Maekawa et al. | |
| 2017/0019041 A1 | 1/2017 | Sugiyama et al. | |
| 2017/0279392 A1 | 9/2017 | Fukushige et al. | |

FOREIGN PATENT DOCUMENTS

| | | |
|---|---|---|
| KR | 10-2010-0067051 | 6/2010 |
| KR | 10-2011-0031094 | 3/2011 |
| KR | 10-2016-0111631 | 9/2016 |
| WO | WO 2016/032508 | 3/2016 |

OTHER PUBLICATIONS

Written Opinion dated May 31, 2018 issued in Application No. PCT/KR2018/002769.
Korean Office Action dated Jan. 29, 2018 issued in KR Application No. 10-2017-0039417.
Korean Notice of Allowance dated Jul. 31, 2018 issued in KR Application No. 10-2017-0039417.
European Search Report dated Nov. 9, 2020 issued in EP Application No. 18778017.6.

* cited by examiner

MOTOR CONTROL MODULE, MOTOR CONTROL DEVICE, MOTOR CONTROL SYSTEM, AND MOTOR CONTROL METHOD

CROSS-REFERENCE TO RELATED PATENT APPLICATIONS

This application is a U.S. National Stage Application under 35 U.S.C. 5371 of PCT Application No. PCT/KR2018/002769, filed Mar. 8, 2018, which claims priority to Korean Patent Application No. 10-2017-0039417, filed Mar. 28, 2017, whose entire disclosures are hereby incorporated by reference.

TECHNICAL FIELD

The present disclosure relates to a motor control module, a motor control device, a motor control system, and a motor control method, and more particularly, to a motor control module for variably controlling a magnetic force of a variable magnetic motor, a motor control device for controlling a variable magnetic motor, and a motor control method for controlling the motor control system and the variable magnetic motor.

BACKGROUND ART

The background of the present invention relates to a control technique for a variable magnetic motor.

A variable magnetic motor refers to a motor that has a rotator including at least one variable magnet and that varies a magnetic force in the motor by increasing or decreasing the magnetic flux of the variable magnets. The magnetic flux of the variable magnet is changed by an electric current applied to the motor. When the electric current is applied to the motor, a magnetic flux is generated in the variable magnet due to electromagnetism. In this case, when the magnetic flux generated in the variable magnet is in the same direction as the magnetic flux direction of a permanent magnet included in the rotor, the magnetic flux is increased by magnetic flux addition. When the magnetic flux is in the opposite direction to the magnetic flux direction of the permanent magnet included in the robot, the magnet flux is decreased by magnetic flux cancellation. Through such a principle of increasing or decreasing the magnetic flux, the magnetic force in the variable magnetic motor is increased or decreased.

A conventional technique for controlling such a variable magnet motor has limitations in that it is difficult to apply an electric current to increase or decrease the magnetic flux while the motor is in operation and in that it is difficult to achieve accurate magnetic flux increase/decrease control according to a control command by the magnetic flux being sensitively changed with a change in electric current. In other words, it is difficult to perform control itself to vary a magnetic force, and it is further difficult to appropriately perform magnetic force control according to the operating state or required performance of the motor. Accordingly, errors may be generated when the magnetic flux and the electric current in the motor and the speed corresponding to the influence of the magnetic flux and the electric current are controlled. In particular, this has been a major limitation in controlling a motor to which a sensorless control method is applied.

Due to these limitations, it is difficult to propose a time point to accurately, efficiently, and variably control a magnetic force, that is, a time point for applying an electric current to increase or decrease a magnetic flux or to propose a technology for controlling an electric current to increase or decrease a magnetic flux. Accordingly, it is difficult to properly and reliably operate the motor and control the operation. In addition, due to the difficulty of accurate magnetic flux control, it is difficult to perform stable and efficient operation and control.

That is, in the related art, a technology itself for accurately and efficiently controlling a variable magnetic motor has not been proposed, and the operating performance of the variable magnetic motor has not been guaranteed. Furthermore, as a result, the use and application of variable magnetic motors have been limited.

DISCLOSURE

Technical Problem

Therefore, the present disclosure is to overcome the limitations of the prior art and thus to provide a motor control module, a motor control device, a motor control system, and a motor control method capable of controlling a magnetic force in a variable magnetic motor by controlling a driving current applied to the motor according to an operating state of the motor.

Also, the present disclosure is to provide a motor control module, a motor control device, a motor control system, and a motor control method capable of properly and efficiently achieving variable magnetic force according to an operating state during magnetic control.

In addition, the present disclosure is to provide a motor control module, a motor control device, a motor control system, and a motor control method capable of accurately and stably performing operation control of a motor and maintaining operating performance thereof when performing magnetic force control.

Technical Solution

The motor control module, the motor control device, the motor control system, and the motor control method disclosed herein to solve the above-described problems are technically characterized in that a magnetic force in a motor is controlled by applying an increasing/decreasing current for increasing or decreasing a magnetic flux in the motor to the motor at a predetermined application time point.

In detail, the magnetic force in the motor is controlled by controlling a driving current applied to the motor at a predetermined application time point using an increasing/decreasing current for increasing or decreasing a magnetic flux in the motor and then by applying the controlled driving current to the motor.

Alternatively, the present disclosure is technically characterized in that the magnetic force in the motor is controlled by controlling the driving current applied to the motor at the predetermined application time point.

In detail, the magnetic force in the motor is controlled by controlling a driving current applied to the motor at a predetermined application time point to increase or decrease a magnetic flux of a variable magnet included in the motor.

The technical features may be applied to the motor control module for controlling the variable magnetic motor, the motor control device for controlling the variable magnetic motor, the motor control system including the variable magnetic motor, the motor control method for controlling the variable magnetic motor, etc., which are described herein, in order to solve the above-described problems.

A motor control module disclosed herein and using the above technical features as a problem-solving means is for controlling a variable magnetic motor, the motor control module including a current control unit configured to generate a current command for controlling a driving current applied to the motor according to an operating state of the motor and a signal generation unit configured to generate a control signal for controlling an inverter for applying a current to the motor according to the current command and apply the control signal to the inverter, wherein the current control unit generates the current command to apply an increasing/decreasing current for increasing or decreasing a magnetic flux in the motor to the motor at a predetermined application time point and controls a magnetic force in the motor.

In an embodiment, the motor may include a rotator which includes a variable magnet and a stator to which the increasing/decreasing current for increasing or decreasing the magnetic flux of the variable magnet is to be applied.

In an embodiment, the motor may have a structure in which the ratio between the number of poles of the rotator and the number of slots of the stator is 4:3.

In an embodiment, the magnetic flux in the motor may be the magnetic flux of the variable magnet, and the magnetic force in the motor may be the magnetic force caused by the magnetic flux of the variable magnet.

In an embodiment, the application time point may be a time point corresponding to a position of a rotator of the motor.

In an embodiment, the application time point may be set to time points of positions where an electrical angle between the rotator and a stator of the motor is 60°, 120°, 180°, and 240°.

In an embodiment, the current control unit may estimate the speed of the motor and the magnetic flux in the motor, determine whether to perform control to increase or decrease the magnetic force in the motor on the basis of a result of the estimation, and generate the current command according to a result of the determination.

In an embodiment, the current control unit may compare a result of the estimation to a predetermined state criterion and determine whether to perform control to increase or decrease the magnetic force depending on a result of the comparison.

In an embodiment, the state criterion may be a criterion for a proper magnetic flux in the motor corresponding to an operating speed of the motor.

In an embodiment, the current control unit may compare the estimated magnetic flux to the proper magnetic flux corresponding to the estimated speed of the state criterion and determine whether to perform control to increase or decrease the magnetic flux depending on a difference between the estimated magnetic flux and the proper magnetic flux.

In an embodiment, the current control unit may generate the current command to increase the magnetic flux in the motor when the current control unit determines to perform control such that the magnetic force in the motor is increased and may generate the current command to decrease the magnetic flux in the motor when the current control unit determines to perform control such that the magnetic force in the motor is decreased.

In an embodiment, the current control unit may control a driving current applied to a stator of the motor such that the increasing/decreasing current is applied to the stator and may increase or decrease a magnetic flux of a variable magnet included in a rotator of the motor by using the increasing/decreasing current applied to the stator.

In an embodiment, the current control unit may control a d-axis current of the driving current applied to the stator such that the increasing/decreasing current is applied to the stator and may increase or decrease the magnetic flux of the variable magnet by using the increasing/decreasing current having the controlled d-axis current.

In an embodiment, the current control unit may control the d-axis current such that a magnetic flux generated by the increasing/decreasing current is in the same direction as a magnetic flux direction of a permanent magnet included in the rotator when the current control unit increases the magnetic flux of the variable magnet and may control the d-axis current such that the magnetic flux generated by the increasing/decreasing current is in the opposite direction to the magnetic flux direction of the permanent magnet when the current control unit decreases the magnetic flux of the variable magnet.

In an embodiment, the current control unit may generate the current command to apply the increasing/decreasing current to the motor at the application time point, and the current control unit may generate the current command to apply the increasing/decreasing current to the motor according to a predetermined application condition.

In an embodiment, the application condition may be a criterion for an application time or an application period of the increasing/decreasing current.

In an embodiment, the application time may be a time corresponding to the magnitude of the increasing/decreasing current for increasing or decreasing the magnetic flux in the motor.

In an embodiment, the application time may be set to a time including the application time of the increasing/decreasing current and a time during which the application of the increasing/decreasing current is maintained.

In an embodiment, the application period is a period for a time when the increasing/decreasing current is applied, the number of times when the increasing/decreasing current is applied, or the number of times the application is repeated.

In an embodiment, the application period may be a control period during which the increasing/decreasing current is applied according to the application time point at least four times and a rotator of the motor is rotated four times or less with respect to the electrical angle between time points at which the increasing/decreasing current is applied, and the control period may be set to be repeated at least two times.

Also, a motor control device disclosed herein to solve the above problems is for controlling a variable magnetic motor, the motor control device including an inverter unit configured to apply a driving current to the motor and a control unit configured to control the inverter unit to control the driving current, wherein the control unit controls a magnetic force in the motor by controlling the driving current such that an increasing/decreasing current for increasing or decreasing a magnetic flux in the motor is applied to the motor at a predetermined application time point.

In an embodiment, the motor may include a rotator which includes a variable magnet and a stator to which the increasing/decreasing current for increasing or decreasing the magnetic flux of the variable magnet is to be applied.

In an embodiment, the motor may have a structure in which the ratio between the number of poles of the rotator and the number of slots of the stator is 4:3.

In an embodiment, the magnetic flux in the motor may be the magnetic flux of the variable magnet, and the magnetic force in the motor may be the magnetic force caused by the magnetic flux of the variable magnet.

In an embodiment, the application time point may be a time point corresponding to a position of a rotator of the motor.

In an embodiment, the application time point may be set to time points of positions where an electrical angle between the rotator and a stator of the motor is 60°, 120°, 180°, and 240°.

In an embodiment, the control unit may estimate the speed of the motor and the magnetic flux in the motor, determine whether to perform control to increase or decrease the magnetic force in the motor on the basis of a result of the estimation, and control the magnetic force in the motor according to a result of the determination.

In an embodiment, the control unit may compare a result of the estimation to a predetermined state criterion and determine whether to perform control to increase or decrease the magnetic force depending on a result of the comparison.

In an embodiment, the state criterion may be a criterion for a proper magnetic flux in the motor corresponding to an operating speed of the motor.

In an embodiment, the control unit may compare the estimated magnetic flux to the proper magnetic flux corresponding to the estimated speed of the state criterion and determine whether to perform control to increase or decrease the magnetic flux depending on a difference between the estimated magnetic flux and the proper magnetic flux.

In an embodiment, the control unit may control the driving current such that the magnetic flux in the motor is increased when the control unit determines to perform control such that the magnetic force in the motor is increased and may control the driving current such that the magnetic flux in the motor is decreased when the control unit determines to perform control such that the magnetic force in the motor is decreased.

In an embodiment, the control unit may control a driving current applied to a stator of the motor such that the increasing/decreasing current is applied to the stator and may increase or decrease a magnetic flux of a variable magnet included in a rotator of the motor by using the increasing/decreasing current applied to the stator.

In an embodiment, the control unit may control a d-axis current of the driving current applied to the stator such that the increasing/decreasing current is applied to the stator and may increase or decrease the magnetic flux of the variable magnet by using the increasing/decreasing current having the controlled d-axis current.

In an embodiment, the control unit may control the d-axis current such that a magnetic flux generated by the increasing/decreasing current is in the same direction as a magnetic flux direction of a permanent magnet included in the rotator when the control unit increases the magnetic flux of the variable magnet and may control the d-axis current such that the magnetic flux generated by the increasing/decreasing current is in the opposite direction to the magnetic flux direction of the permanent magnet when the control unit decreases the magnetic flux of the variable magnet.

In an embodiment, the control unit may control the driving current such that the increasing/decreasing current is applied to the motor at the application time point and may control the driving current such that the increasing/decreasing current is applied to the motor according to a predetermined application condition.

In an embodiment, the application condition may be a criterion for an application time or an application period of the increasing/decreasing current.

In an embodiment, the application time may be a time corresponding to the magnitude of the increasing/decreasing current for increasing or decreasing the magnetic flux in the motor.

In an embodiment, the application time may be set to a time including the application time of the increasing/decreasing current and a time during which the application of the increasing/decreasing current is maintained.

In an embodiment, the application period may be a period for a time when the increasing/decreasing current is applied, the number of times the increasing/decreasing current is applied, or the number of times the application is repeated.

In an embodiment, the application period may be a control period during which the increasing/decreasing current is applied according to the application time point at least four times and a rotator of the motor is rotated four times or less with respect to the electrical angle between time points at which the increasing/decreasing current is applied, and the control period may be set to be repeated at least two times.

Also, a motor control system disclosed herein to solve the above problems includes a variable magnetic motor including a rotator including a variable magnet and a stator for increasing or decreasing a magnetic flux of the variable magnet; and a control device configured to apply a driving current to the motor and control operation of the motor, wherein the control device estimates speed of the motor and a magnetic flux in the motor, determines whether to perform control to increase or decrease the magnetic force in the motor on the basis of a result of the estimation, and applies an increasing/decreasing current for increasing or decreasing the magnetic flux of the variable magnet to the stator at a predetermined application time point according to a result of the determination to control the magnetic force in the motor.

In an embodiment, the motor may have a structure in which the ratio between the number of poles of the rotator and the number of slots of the stator is 4:3.

In an embodiment, the application time point may be set to time points of positions where an electrical angle between the rotator and a stator of the motor is 60°, 120°, 180°, and 240°.

In an embodiment, the control device may compare the estimation result to a predetermined state criterion, determine whether to perform control to increase or decrease the magnetic flux depending on a result of the comparison, and apply the increasing/decreasing current to the stator according to a result of the determination.

In an embodiment, the state criterion may be a criterion for a proper magnetic flux in the motor corresponding to an operating speed of the motor.

In an embodiment, the control unit may compare the estimated magnetic flux to the proper magnetic flux corresponding to the estimated speed of the state criterion and determine whether to perform control to increase or decrease the magnetic flux depending on a difference between the estimated magnetic flux and the proper magnetic flux.

In an embodiment, when the control device determines to perform control such that the magnetic force in the motor is increased, the control device may apply the increasing/decreasing current to the stator to increase the magnetic flux of the variable magnet. When the control device determines to perform control such that the magnetic force in the motor is decreased, the control device may apply the increasing/decreasing current to the stator to decrease the magnetic flux of the variable magnet.

In an embodiment, the control unit may control the driving current applied to the stator such that the increasing/ decreasing current is applied to the stator and may increase or decrease the magnetic flux of the variable magnet through a magnetic flux generated in the stator by using the increasing/decreasing current.

In an embodiment, the control device may control a d-axis current of the driving current such that the increasing/decreasing current is applied to the stator and may increase or decrease the magnetic flux of the variable magnet by using the increasing/decreasing current having the controlled d-axis current.

In an embodiment, the control device may control the d-axis current such that a magnetic flux generated in the stator by the increasing/decreasing current is in the same direction as a magnetic flux direction of a permanent magnet included in the rotor when the control unit increases the magnetic flux of the variable magnet and may control the d-axis current such that the magnetic flux generated in the stator by the increasing/decreasing current is in the opposite direction to the magnetic flux direction of the permanent magnet when the control unit decreases the magnetic flux of the variable magnet.

In an embodiment, the control device may apply the increasing/decreasing current to the stator at the application time point and may apply the increasing/decreasing current to the stator according to a predetermined application condition.

In an embodiment, the application condition may be a criterion for an application time or an application period of the increasing/decreasing current.

In an embodiment, the application time may be a time corresponding to the magnitude of the increasing/decreasing current for increasing or decreasing the magnetic flux of the variable magnet.

In an embodiment, the application time may be set to a time including the application time of the increasing/decreasing current and a time during which the application of the increasing/decreasing current is maintained.

In an embodiment, the application period may be a period for a time when the increasing/decreasing current is applied, the number of times the increasing/decreasing current is applied, or the number of times the application is repeated.

In an embodiment, the application period may be a control period during which the increasing/decreasing current is applied according to the application time point at least four times and a rotator of the motor is rotated four times or less with respect to the electrical angle between time points at which the increasing/decreasing current is applied, and the control period may be set to be repeated at least two times.

Also, a motor control method disclosed herein to solve the above problems is for controlling a variable magnetic motor, the motor control method including the steps of: estimating speed of the motor and a magnetic flux in the motor while the motor is in operation, comparing the magnetic flux in the motor to a predetermined magnetic flux reference and determining whether to perform control to increase or decrease the magnetic force in the motor when the speed of the motor reaches a predetermined speed reference, and controlling a driving current applied to the motor such that the magnetic force in the motor is increased or decreased depending on a result of the determination, and the controlling step includes controlling the driving current applied at a predetermined application time point to increase or decrease the magnetic flux in the motor.

In an embodiment, the motor may include a rotator including a variable magnet and a stator for increasing or decreasing a magnetic flux of the variable magnet by using the driving current and may have a structure in which the ratio between the number of poles of the rotator and the number of slots of the stator is 4:3.

In an embodiment, the magnetic force in the motor may be a magnetic force caused by the variable magnet included in the rotator of the motor.

In an embodiment, the magnetic flux reference may be a criterion for a proper magnetic flux in the motor corresponding to the speed reference.

In an embodiment, in the determination step, when the difference between the magnetic flux in the motor and the magnetic flux reference is greater than or equal to a predetermined reference value, it may be determined that the increase or decrease in the magnetic force in the motor is necessary.

In an embodiment, the application time point may be set to time points of positions where an electrical angle between the rotator and the stator is 60°, 120°, 180°, and 240°.

In an embodiment, in the step of controlling the driving current, a d-axis current of the driving current applied to the stator of the motor may be controlled to increase or decrease the magnetic flux of the variable magnet included in the rotator of the motor.

In an embodiment, in the step of controlling the driving current, the magnetic flux of the variable magnet may be increased by controlling the d-axis current such that the magnetic flux generated by the driving current is in the same direction as the magnetic flux direction of the permanent magnet included in the rotator when the magnetic force in the motor is increased, and the magnetic flux of the variable magnet may be decreased by controlling the d-axis current such that the magnetic flux generated by the driving current is in the opposite direction to the magnetic flux direction of the permanent magnet when the magnetic force in the motor is decreased.

In an embodiment, the step of controlling the driving current may include controlling the driving current according to a predetermined application condition.

In an embodiment, the application condition may be a criterion for an application time or an application period of the driving current.

In an embodiment, the application time may be a time corresponding to the magnitude of the driving current for increasing or decreasing the magnetic flux of the variable magnet.

In an embodiment, the application time may be set to a time including the application time of the driving current and a time during which the application of the driving current is maintained.

In an embodiment, the application period may be a period for a time when the driving current is applied, the number of times the driving current is applied, or the number of times the application is repeated.

In an embodiment, the application period may be a control period during which the driving current is applied according to the application time point at least four times and a rotator of the motor is rotated four times or less with respect to the electrical angle between time points at which the driving current is applied, and the control period may be set to be repeated at least two times.

Advantageous Effect

According to the motor control module, the motor control device, the motor control system, and the motor control method disclosed herein, by applying an increasing/decreasing current for increasing or decreasing a magnetic flux in a motor to the motor at a predetermined application time point depending on the operating state of the motor, it is possible to properly and efficiently increase or decrease magnetic force according to the operating state of the motor.

According to the motor control module, the motor control device, the motor control system, and the motor control method disclosed herein, it is possible to stably and efficiently operate a variable magnetic motor and increase the utility and availability of the motor.

According to the motor control module, the motor control device, the motor control system, and the motor control method disclosed herein, it is possible to accurately and stably control a variable magnetic motor and maintain operating performance thereof.

Furthermore, according to the motor control module, the motor control device, the motor control system, and the motor control method disclosed herein, through the effects as described above, it is possible to overcome the conventional limitations in the art and also expand the availability/applicability and scope of the art. Thus, it is possible to expand and improve the performance and functions of a variable magnetic motor, its control technology, or any fields to which such technology is applied.

BEST MODES

Figure 1:
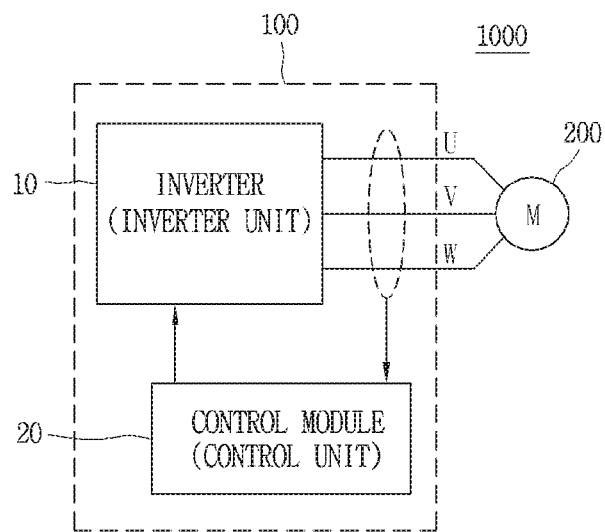
FIG. 1 is a block diagram showing a configuration of a variable magnetic motor control system to which a motor control module, a motor control device, a motor control system, and a motor control method disclosed herein are applied.

A motor control module disclosed herein for controlling a variable magnetic motor includes a current control unit configured to generate a current command for controlling a driving current applied to the motor according to an operating state of the motor and a signal generation unit configured to generate a control signal for controlling an inverter for applying a current to the motor according to the current command and apply the control signal to the inverter, wherein the current control unit generates the current command to apply an increasing/decreasing current for increasing or decreasing a magnetic flux in the motor to the motor at a predetermined application time point and controls a magnetic force in the motor.

A motor control device disclosed herein for controlling a variable magnetic motor by including the above-described motor control module includes an inverter unit configured to apply a driving current to the motor and a control unit configured to control the inverter unit to control the driving current, wherein the control unit controls a magnetic force in the motor by controlling the driving current such that an increasing/decreasing current for increasing or decreasing a magnetic flux in the motor is applied to the motor at a predetermined application time point, and the control unit may be the above-described motor control module.

A motor control system disclosed herein for controlling a variable magnetic motor by including the above-described motor control device includes a variable magnetic motor including a rotator including a variable magnet and a stator for increasing or decreasing a magnetic flux of the variable magnet and a control device configured to apply a driving current to the motor and control operation of the motor, wherein the control device estimates speed of the motor and a magnetic flux in the motor, determines whether to perform control to increase or decrease the magnetic force in the motor on the basis of a result of the estimation, and applies an increasing/decreasing current for increasing or decreasing the magnetic flux of the variable magnet to the stator at a predetermined application time point according to a result of the determination to control the magnetic force in the motor, and the control device may be the above-described motor control device.

A motor control method disclosed herein for controlling a variable magnetic motor of the above-described motor control module, motor control device, and motor control system includes the steps of: estimating speed of the motor and a magnetic flux in the motor while the motor is in operation, comparing the magnetic flux in the motor to a predetermined magnetic flux reference and determining whether to perform control to increase or decrease the magnetic force in the motor when the speed of the motor reaches a predetermined speed reference, and controlling a driving current applied to the motor such that the magnetic force in the motor is increased or decreased depending on a result of the determination, and the controlling step includes controlling the driving current applied at a predetermined application time point to increase or decrease the magnetic flux in the motor.

MODES FOR CARRYING OUT THE PREFERRED EMBODIMENTS

It is noted that the technical terms used herein are used only to describe specific embodiments and are not intended to limit the invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

A singular representation used herein may include a plural representation unless it represents a definitely different meaning from the context. In this application, the terms "comprising" and "including" should not be construed to necessarily include all of the elements or steps disclosed herein, and should be construed not to include some of the elements or steps thereof, or should be construed to further include additional elements or steps.

In describing the present disclosure, if a detailed explanation for a related known function or construction is considered to unnecessarily divert the gist of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

Hereinafter, the motor control module, the motor control device, the motor control system, and the motor control method disclosed herein will be sequentially described with reference to FIGS. 1 to 18.

FIG. 1 is a block diagram showing a configuration of a variable magnetic motor control system to which the motor control module, the motor control device, the motor control system, and the motor control method disclosed herein are applied.

Figure 2:
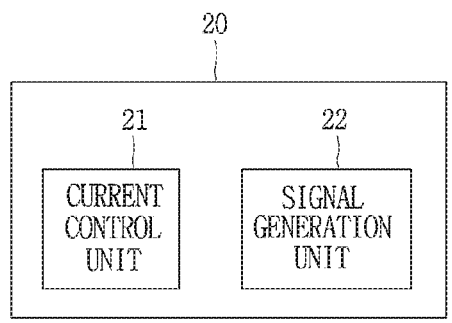
FIG. 2 is a block diagram showing a configuration of a motor control module disclosed herein.

FIG. 2 is a block diagram showing a configuration of the motor control module disclosed herein.

Figure 3:
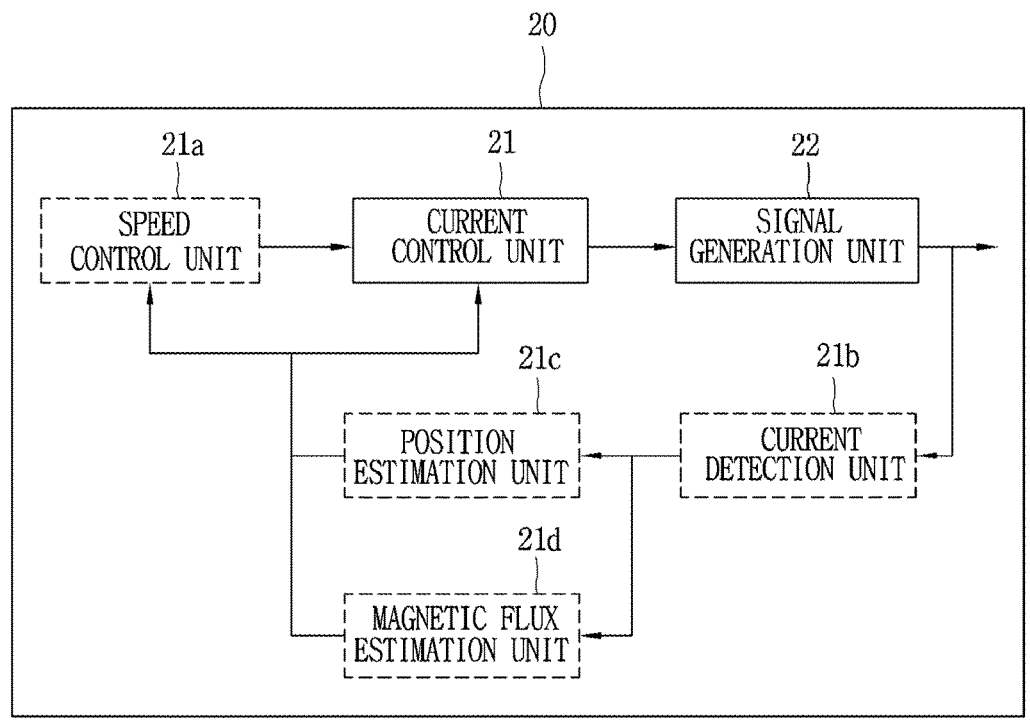
FIG. 3 is a block diagram showing a configuration according to an embodiment of the motor control module shown in FIG. 2.

FIG. 3 is a block diagram showing a configuration according to an embodiment of the motor control module shown in FIG. 2.

Figure 4:
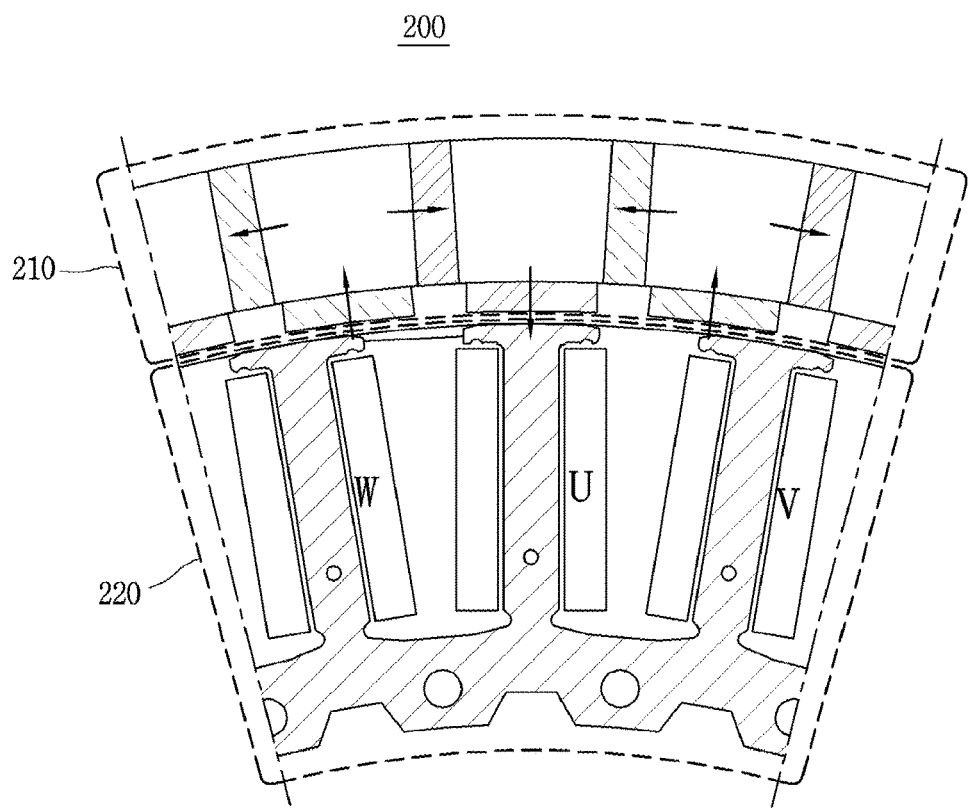
FIG. 4 is an exemplary diagram showing a structure of a variable magnetic motor of the motor control module, the motor control device, the motor control system, and the motor control method disclosed herein.

FIG. 4 is an exemplary diagram showing a structure of a variable magnetic motor of the motor control module, the motor control device, the motor control system, and the motor control method disclosed herein.

Figure 5:
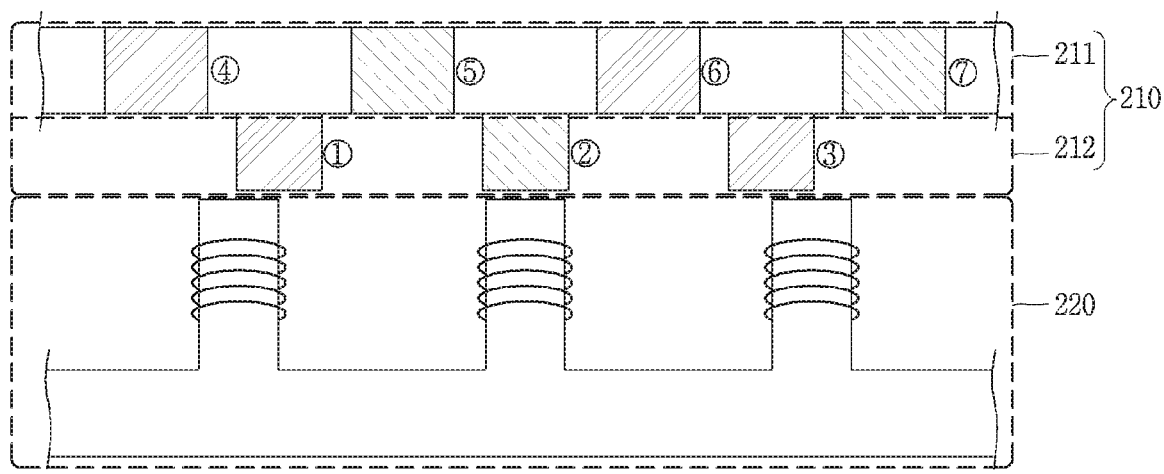
FIG. 5 is an exemplary diagram showing a simplified structure of the variable magnetic motor as shown in FIG. 4.

FIG. 5 is an exemplary diagram showing a simplified structure of the variable magnetic motor as shown in FIG. 4.

Figure 6:
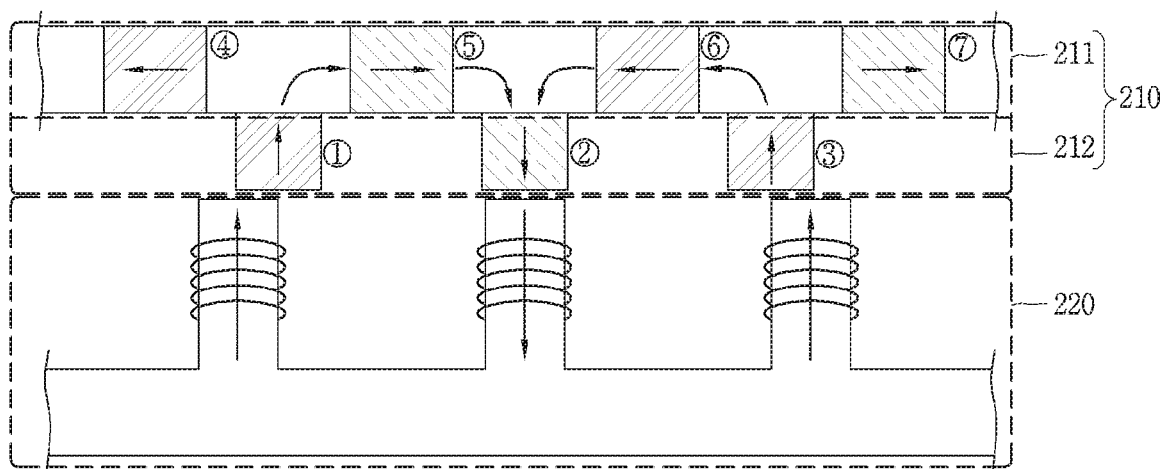
FIG. 6 is an exemplary diagram showing an example in which control is performed to increase a magnetic force in a structure as shown in FIG. 5.

FIG. 6 is an exemplary diagram showing an example in which control is performed to increase a magnetic force in a structure as shown in FIG. 5.

Figure 7:
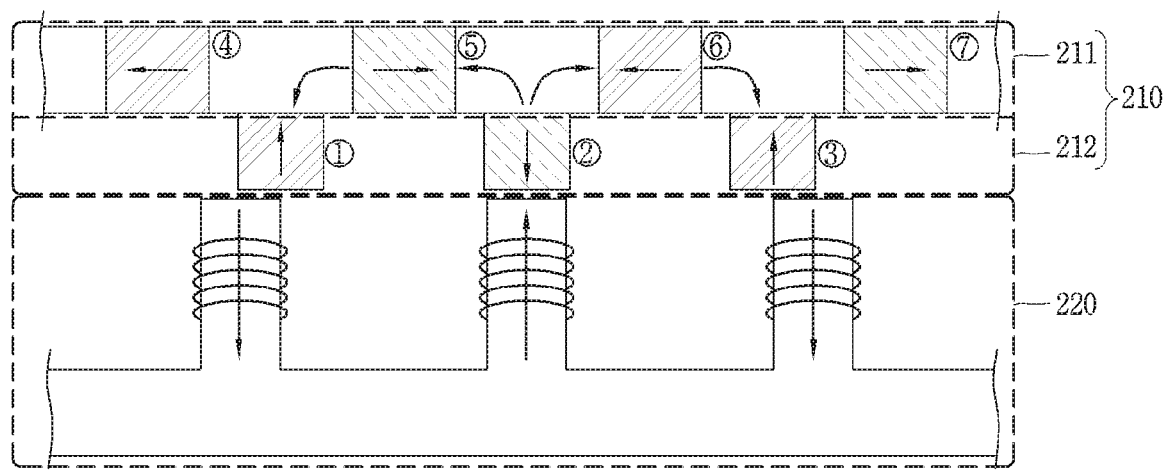
FIG. 7 is an exemplary diagram showing an example in which control is performed to decrease a magnetic force in a structure as shown in FIG. 5.

FIG. 7 is an exemplary diagram showing an example in which control is performed to decrease a magnetic force in a structure as shown in FIG. 5.

Figure 8:
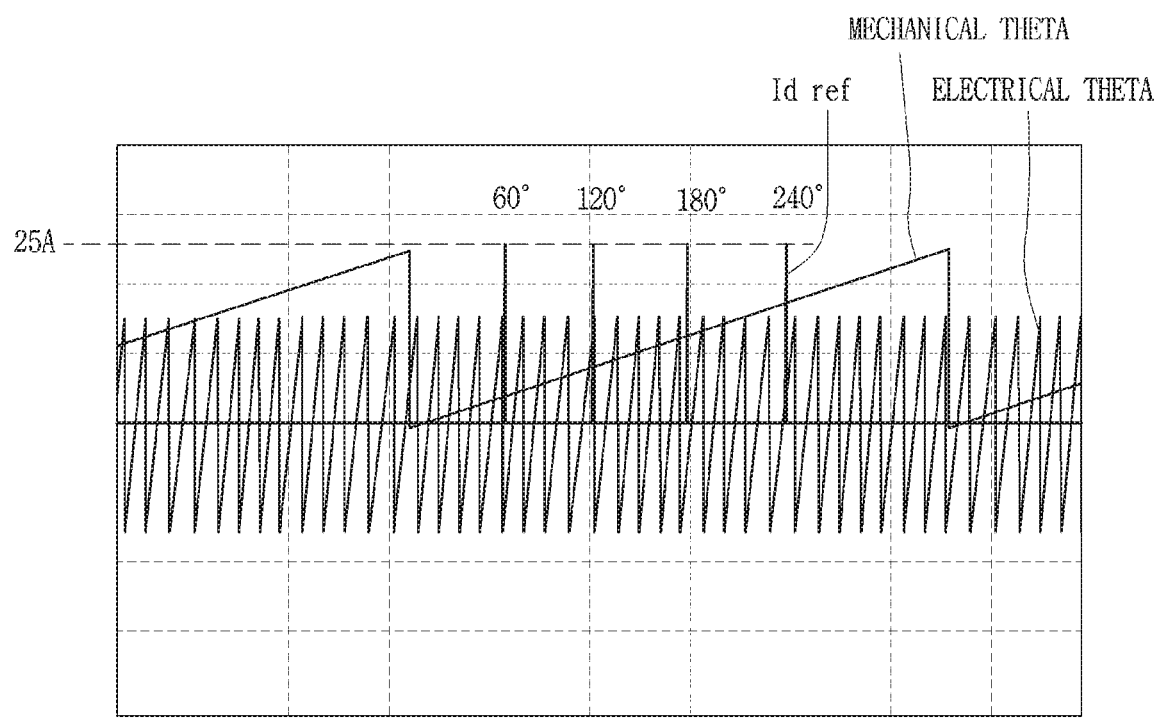
FIG. 8 is an exemplary diagram illustrating a concept of an application time point of an increasing/decreasing current of the motor control module, the motor control device, the motor control system, and the motor control method disclosed herein.

FIG. 8 is an exemplary diagram illustrating a concept of an application time point of an increasing/decreasing current of the motor control module, the motor control device, the motor control system, and the motor control method disclosed herein.

Figure 9:
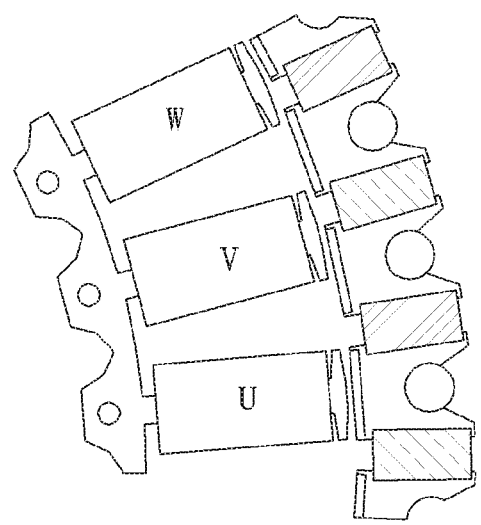
FIG. 9 is a first exemplary diagram illustrating an example position at an application time point of an increasing/decreasing current of the motor control module, the motor control device, the motor control system, and the motor control method disclosed herein.

FIG. 9 is a first exemplary diagram illustrating an example position at an application time point of an increasing/decreasing current of the motor control module, the motor control device, the motor control system, and the motor control method disclosed herein.

Figure 10:
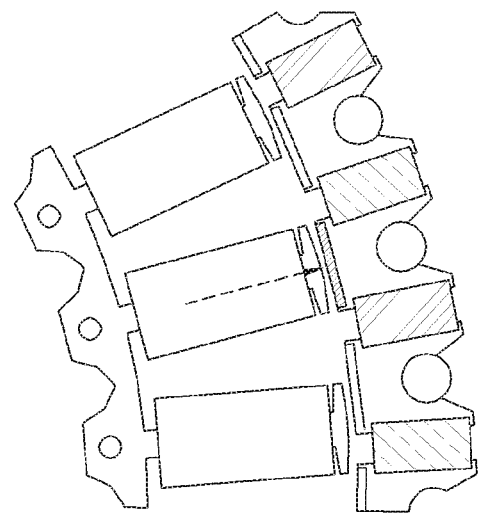
FIG. 10 is a second exemplary diagram illustrating an example position at an application time point of an increasing/decreasing current of the motor control module, the motor control device, the motor control system, and the motor control method disclosed herein.

FIG. 10 is a second exemplary diagram illustrating an example position at an application time point of an increasing/decreasing current of the motor control module, the motor control device, the motor control system, and the motor control method disclosed herein.

Figure 11:
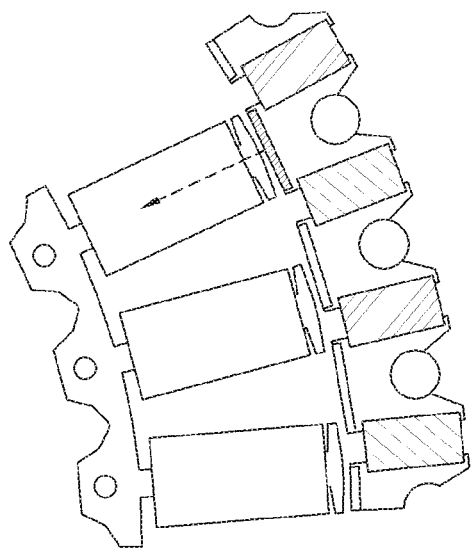
FIG. 11 is a third exemplary diagram illustrating an example position at an application time point of an increasing/decreasing current of the motor control module, the motor control device, the motor control system, and the motor control method disclosed herein.

FIG. 11 is a third exemplary diagram illustrating an example position at an application time point of an increasing/decreasing current of the motor control module, the motor control device, the motor control system, and the motor control method disclosed herein.

Figure 12:
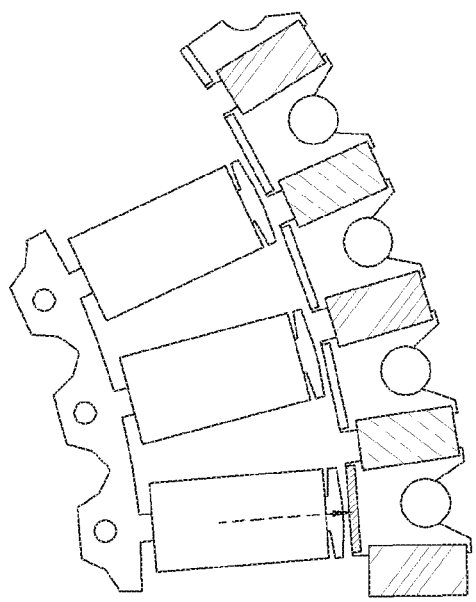
FIG. 12 is a fourth exemplary diagram illustrating an example position at an application time point of an increasing/decreasing current of the motor control module, the motor control device, the motor control system, and the motor control method disclosed herein.

FIG. 12 is a fourth exemplary diagram illustrating an example position at an application time point of an increasing/decreasing current of the motor control module, the motor control device, the motor control system, and the motor control method disclosed herein.

Figure 13:
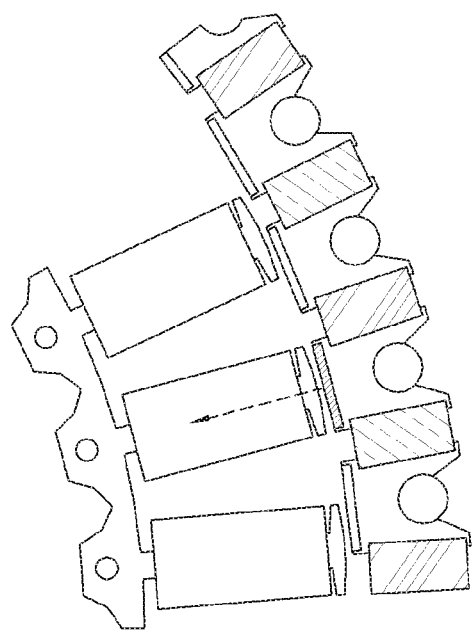
FIG. 13 is a fifth exemplary diagram illustrating an example position at an application time point of an increasing/decreasing current of the motor control module, the motor control device, the motor control system, and the motor control method disclosed herein.

FIG. 13 is a fifth exemplary diagram illustrating an example position at an application time point of an increasing/decreasing current of the motor control module, the motor control device, the motor control system, and the motor control method disclosed herein.

Figure 14:
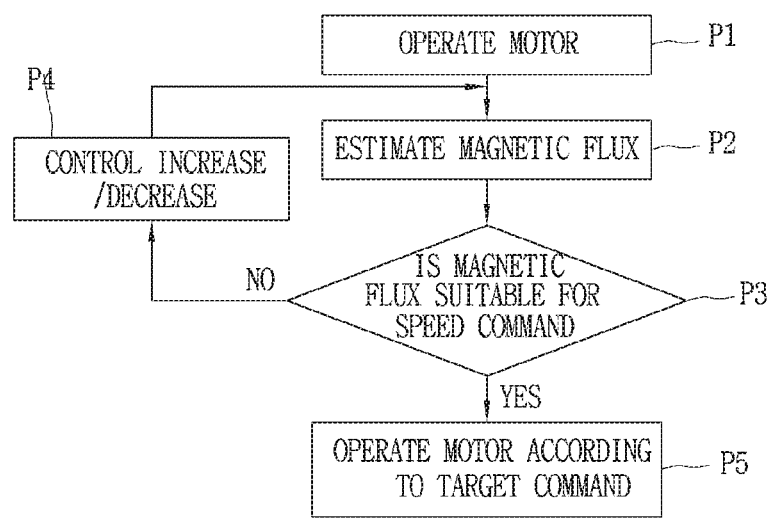
FIG. 14 is an exemplary diagram showing an example of a magnetic force control process of the motor control module, the motor control device, the motor control system, and the motor control method disclosed herein.

FIG. 14 is an exemplary diagram showing an example of a magnetic force control process of the motor control module, the motor control device, the motor control system, and the motor control method disclosed herein.

Figure 15:
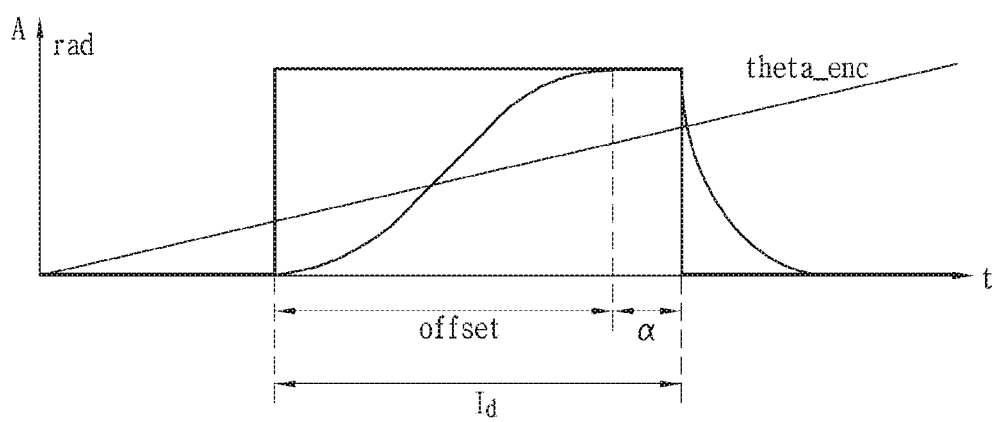
FIG. 15 is an exemplary diagram illustrating a concept of an application time of an increasing/decreasing current of the motor control module, the motor control device, the motor control system, and the motor control method disclosed herein.

FIG. 15 is an exemplary diagram illustrating a concept of an application time of an increasing/decreasing current of the motor control module, the motor control device, the motor control system, and the motor control method disclosed herein.

Figure 16:
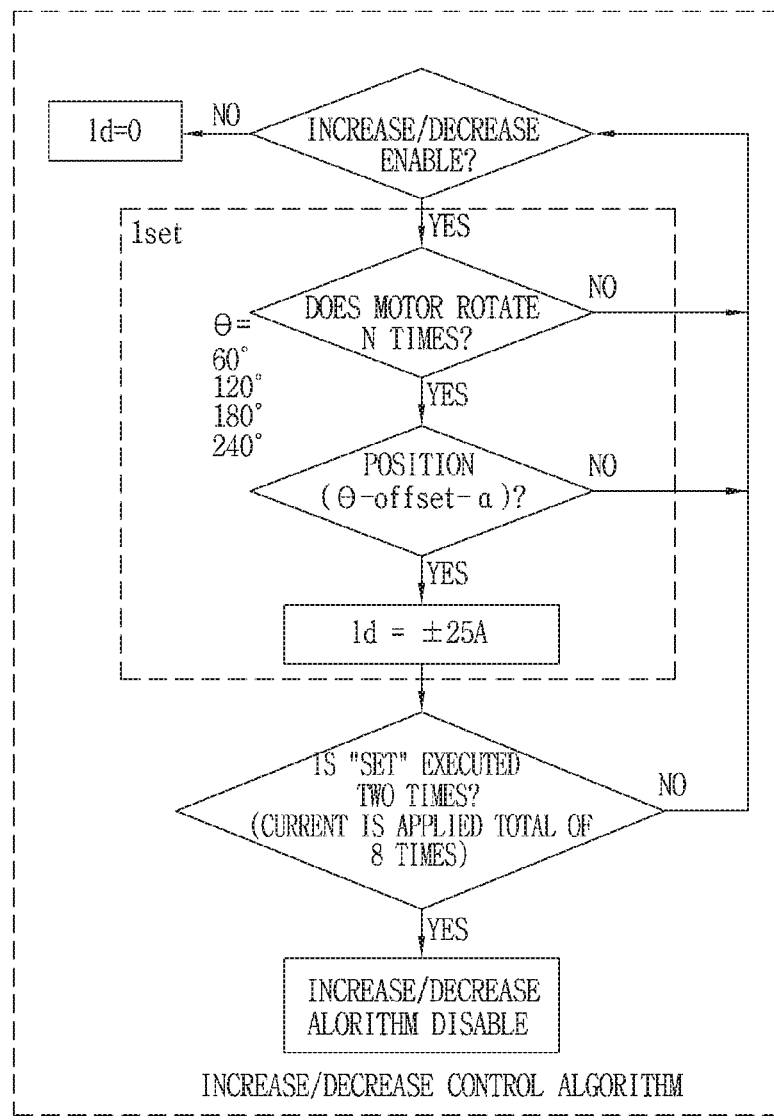
FIG. 16 is an algorithm diagram showing a magnetic force control algorithm corresponding to an application period of an increasing/decreasing current of the motor control module, the motor control device, the motor control system, and the motor control method disclosed herein.

FIG. 16 is an algorithm diagram showing a magnetic force control algorithm corresponding to an application period of an increasing/decreasing current of the motor control module, the motor control device, the motor control system, and the motor control method disclosed herein.

Figure 17:
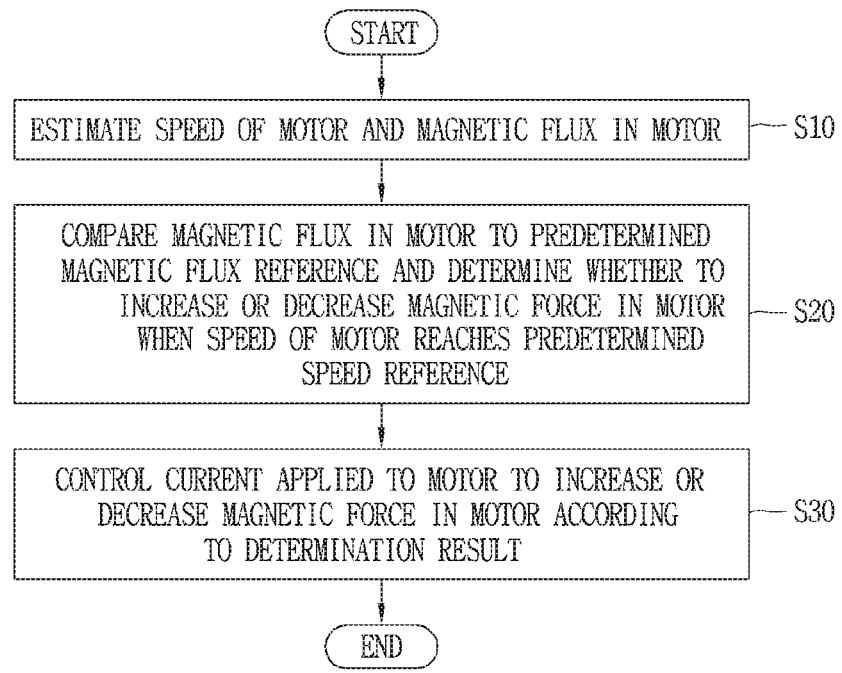
FIG. 17 is a flowchart showing the sequence of the motor control method disclosed herein.

FIG. 17 is a flowchart showing the sequence of the motor control method disclosed herein.

Figure 18:
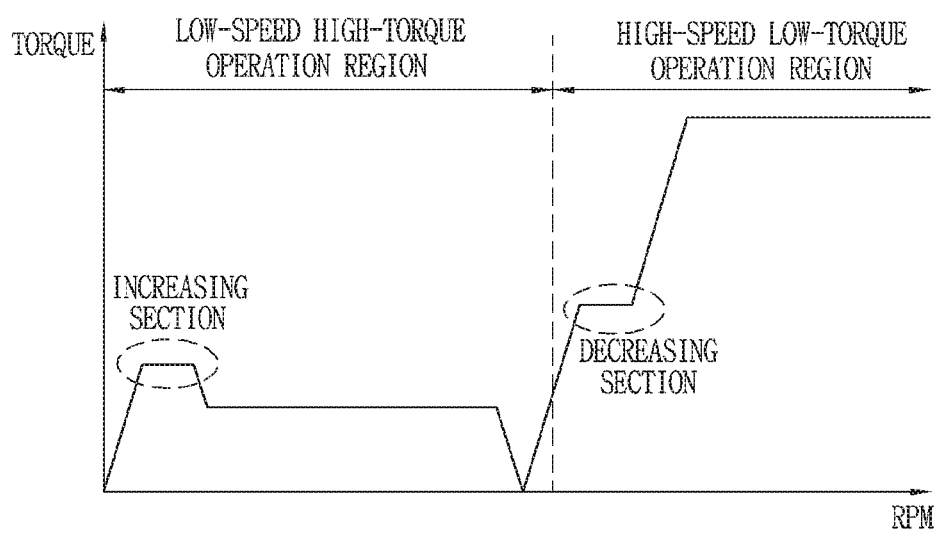
FIG. 18 is an exemplary diagram illustrating an example according to an embodiment of the motor control method disclosed herein.

FIG. 18 is an exemplary diagram illustrating an example according to an embodiment of the motor control method disclosed herein.

<Motor Control Module>

First, the motor control module disclosed herein will be described.

The motor control module disclosed herein may be implemented using some or a combination of the elements or steps included in the following embodiments or using a combination of the embodiments. The technical terms used herein are only used to describe specific embodiments and do not limit the spirit of the technology disclosed herein.

The motor control module (hereinafter referred to as a control module) may be a control module for controlling a variable magnetic motor.

In a control system 1000 of a variable magnetic motor 200 (hereinafter referred to as a motor) as shown in FIG. 1, a control module 20 may be a control-dedicated module included in a motor control device (hereinafter referred to as a control device) for controlling the motor 200 and configured to control the motor 200.

That is, the control module 20 may be a control unit included in the control device 100.

The control module 20 may refer to a central processing unit included in the control device 100 and configured to perform computation and signal processing of the control device 100.

The control module 20 may be included in the control device 100 and configured to control an inverter 10 included in the control device 100.

Here, the inverter 10 may refer to a power conversion device configured to apply a driving current to the motor 200 and drive the motor 200.

That is, the control module 20 may control the motor 200 by controlling the inverter 10 to control the driving current applied to the motor 200.

As shown in FIG. 2, the control module 20 includes a current control unit 21 and a signal generation unit 22.

The current control unit 21 generates a current command for controlling the driving current applied to the motor according to an operating state of the motor 200, and the signal generation unit 22 generates a control signal for controlling the inverter 10 for inverting a current to the motor according to the current command and applies the control signal to the inverter 10.

The current control unit 21 estimates the operating state of the motor 200 and generates the current command according to the operating state of the motor 200 so that the inverter 10 may control the driving current applied to the motor 200 according to the operating state of the motor 200.

The signal generation unit 22 controls the inverter 10 by generating the control signal according to the current command so that the inverter 10 may control the driving current applied to the motor 200 according to the current command.

That is, by the current control unit 21 generating the current command according to the operating state of the motor 200 and by the signal generation unit 22 generating the control signal according to the current command and applying the control signal to the inverter 10, the control module 20 may control the inverter 10.

Thus, by controlling the inverter 10 to control the driving current applied to the motor 200, the control module 20 controls a magnetic force in the motor 200.

The detailed configuration of the control module 20 may be the same as shown in FIG. 3.

The control module 20 may include the current control unit 21 and the signal generation unit 22, as shown in FIG. 3, and may further include a speed control unit 21*a*, a current detection unit 21*b*, a position estimation unit 21*c*, and a magnetic flux estimation unit 21*d*.

The speed control unit 21*a* may generate a speed command for controlling the speed of the motor 200 on the basis of the operating state of the motor 200 or an instruction input from the outside. The current detection unit 21*b* may detect the driving current applied to the motor 200. The position estimation unit 21*c* and the magnetic flux estimation unit 21*d* may estimate the position of the motor 200 and the magnetic flux in the motor 200 on the basis of a result of the detection by the current detection unit 21*b*.

The speed control unit 21*a*, the current detection unit 21*b*, the position estimation unit 21*c*, and the magnetic flux estimation unit 21*d* may be included in the current control unit 21. The current control unit 21 may estimate the operating state of the motor 200 through the speed control unit 21*a*, the current detection unit 21*b*, the position estimation unit 21*c*, and the magnetic flux estimation unit 21*d* and may generate the current command according to the operating state of the motor 200 so that the inverter 10 controls the driving current applied to the motor 200 according to the operating state of the motor 200.

In the control module 20 having such a configuration, the current control unit 21 generates the current command to apply an increasing/decreasing current for increasing or decreasing the magnetic flux in the motor 200 to the motor 200 at a predetermined application time point and controls the magnetic force in the motor 200.

That is, by generating the current command to apply the increasing/decreasing current to the motor 200 at the application time point and generating the control signal according to the current command to control the inverter 10, the control module 20 controls the magnetic force in the motor 200.

In other words, the control module 20 may control the inverter 10 such that the increasing/decreasing current is applied to the motor 200 according to the operating state of the motor 200 and thus may control the magnetic flux of the motor 200.

The motor 200 having the magnetic force controlled by the increasing/decreasing current control of the control module 20 may be a variable magnetic motor including a variable magnet and having the magnetic force varying depending on an increase or decrease in the magnetic flux of the variable magnet.

As shown in FIG. 4, the motor 200 may include a rotator 210 which includes a variable magnet and a stator 220 to which the increasing/decreasing current for increasing or decreasing the magnetic flux of the variable magnet is to be applied.

The rotator 210 may include one or more permanent magnets and one or more variable magnets having the magnetic flux increasing or decreasing due to the influence of the increasing/decreasing current, and the stator 220 may include one or more coil slots to which the increasing/decreasing current is to be applied.

That is, the motor 200 may be composed of the rotator 210 including one or more variable magnets and the stator 220 having a coil to which the increasing/decreasing current is to be applied The motor 200 may have a structure in which the ratio between the number of poles of the rotator 210 and the number of slots of the stator 220 is 4:3.

For example, the number of poles of the rotator 210 may be 48, and the number of slots of the stator 220 may be 36.

In the motor 200 having the aforementioned configuration, the increasing/decreasing current is applied to the stator 220, and the magnetic flux in the motor 200 is increased or decreased by the increasing/decreasing current. Thus, the magnetic force in the motor 200 may be varied.

The magnetic flux in the motor 200 may be the magnetic flux of the variable magnet, and the magnetic force in the motor 200 may be a magnetic force caused by the magnetic flux of the variable magnet.

That is, by controlling the increasing/decreasing current such that the magnetic flux of the variable magnet is increased or decreased to increase or decrease the magnetic flux of the variable magnet through the increasing/decreasing current, the control module 20 may control the magnetic force in the motor 200.

An example in which the magnetic force in the motor 200 is controlled by the increasing/decreasing current will be described as follows.

FIG. 5 is a diagram showing a simplified structure of the motor 200 as shown in FIG. 4. The rotator 210 may have an upper portion 211 composed of permanent magnets and a lower portion 212 composed of variable magnets. Among the magnets of the rotator 210, magnets 1, 3, 4, and 6 shown with upward diagonals may correspond to N-pole magnets, and magnets 2, 5, and 7 shown with downward diagonals may correspond to S-pole magnets.

When the increasing/decreasing current is applied to each coil of the stator 220 in the structure as shown in FIG. 5, the magnetic flux is generated in the variable magnet 212 along the direction of the increasing/decreasing current. Along with a change in the magnetic flux of the variable magnet 212, the magnetic force of the rotator 210 may be increased or decreased.

In an example of performing control such that the magnetic force of the rotator 210 is increased, as shown in FIG. 6, by applying the increasing/decreasing current to each coil of the stator 220 in the same direction as the magnetic flux direction of the permanent magnet 211 such that the magnetic flux generated in the variable magnet 212 due to the increasing/decreasing current is in the same direction as the magnetic flux direction of the permanent magnet 211 and by increasing the magnetic flux of the variable magnet 212 through the magnetic flux generated in the same direction, the magnetic force of the rotator 210 may be increased.

In an example of performing control such that the magnetic force of the rotator 210 is decreased, as shown in FIG. 7, by applying the increasing/decreasing current to each coil of the stator 220 in the opposite direction to the magnetic flux direction of the permanent magnet 211 such that the magnetic flux generated in the variable magnet 212 due to the increasing/decreasing current is in the opposite direction to the magnetic flux direction of the permanent magnet 211 and by decreasing the magnetic flux of the variable magnet 212 through the magnetic flux generated in the opposite direction, the magnetic force of the rotator 210 may be decreased.

That is, the control module 20 may control the increasing/decreasing current by generating the current command to apply the increasing/decreasing current to the stator 220 in the same direction as the magnetic flux direction of the permanent magnet 211 when control is performed such that the magnetic force in the motor 200 is increased and by generating the current command to apply the increasing/decreasing current to the stator 220 in the opposite direction to the magnetic flux direction of the permanent magnet 211 when control is performed such that the magnetic force in the motor 200 is decreased.

The current control unit 21 may generate the current command to perform control such that the increasing/decreasing current is applied so that the magnetic flux in the motor 200 is increased or decreased depending on the operating state of the motor 200. In this case, the current control unit 21 may generate the current command to apply the increasing/decreasing current at the application time point.

That is, the current control unit 21 may perform control such that the increasing/decreasing current is applied at the predetermined application time point.

The application time point may be a time point corresponding to the position of the rotator 210 of the motor 200.

The application time point may be set to time points of positions where the electrical angle between the rotator 210 and the stator 220 of the motor 200 is 60°, 120°, 180°, and 240°.

That is, as shown in FIG. 8, the increasing/decreasing current may be applied to the stator 220 at the time points of the positions where the electrical angle between the rotator 210 and the stator 220 is 60°, 120°, 180°, and 240°.

This is set according to a structure in which the ratio between the number of poles of the rotator 210 and the number of slots of the stator 220 is 4:3. That is, the application time point set as the time points of the positions where the electrical angle between the rotator 210 and the stator 220 of the motor 200 is 60°, 120°, 180°, and 240° may be optimized for a motor having the structure in which the ratio between the number of poles of the rotator 210 and the number of slots of the stator 220 is 4:3.

Specific examples in which the increasing/decreasing current is applied at each of the application time points will be described below with reference to FIGS. 9 to 13.

FIG. 9 shows a reference position of the rotator 210 and the stator 220. FIG. 10 shows a position where the electrical angle between the rotator 210 and the stator 220 of the motor 200 is 60°. FIG. 11 shows a position where the electrical angle between the rotator 210 and the stator 220 of the motor 200 is 120°. FIG. 12 shows a position where the electrical angle between the rotator 210 and the stator 220 of the motor 200 is 180°. FIG. 13 shows a position where the electrical angle between the rotator 210 and the stator 220 of the motor 200 is 240°.

When the increasing/decreasing current is applied to the coil of the stator 220 at the application time point, the motor 200 may be rotated at the positions of the rotator 210 and the stator 220 as shown in FIG. 9. When the electrical angle between the rotator 210 and the stator 220 of the motor 200 becomes 60° as shown in FIG. 10, a first increasing/decreasing current may be applied to a coil corresponding to the V-phase of the stator 220. When the electrical angle between the rotator 210 and the stator 220 of the motor 200 becomes 120° as shown in FIG. 11, a second increasing/decreasing current may be applied to a coil corresponding to the W-phase of the stator 220. When the electrical angle between the rotator 210 and the stator 220 of the motor 200 becomes 180° as shown in FIG. 12, a third increasing/decreasing current may be applied to a coil corresponding to the U-phase of the stator 220. When the electrical angle between the rotator 210 and the stator 220 of the motor 200 becomes 240° as shown in FIG. 13, a fourth increasing/decreasing current may be applied to a coil corresponding to the V-phase of the stator 220.

In this case, the increasing/decreasing current applied to each of the application time points may be applied as a current in the direction for increasing or decreasing the magnetic flux of the variable magnet 212 depending on whether to perform control to increase or decrease the magnetic force in the motor 200.

Also, in this case, the increasing/decreasing current may be applied with a magnitude sufficient to increase or decrease the magnetic flux of the variable magnet 212.

For example, as shown in FIG. 8, the increasing/decreasing current may be applied with a magnitude of about 25 [A].

The application time point may be differently set depending on the structure of the motor 200.

The current control unit 21 may estimate the operating state of the motor 200 while the motor 200 is in operation. When the position of the rotator 210 corresponds to electrical angles with the stator 220 being 60°, 120°, 180°, and 240°, the current control unit 21 may perform control such that the increasing/decreasing current is applied to the stator 220.

That is, the current control unit 21 may perform control to increase or decrease the magnetic force in the motor 200 at the application time point.

The current control unit 21 may estimate the speed of the motor 200 and the magnetic flux in the motor 200, determine whether to perform control to increase or decrease the magnetic force in the motor 200 on the basis of a result of the estimation, and generate the current command according to a result of the determination.

That is, the current control unit 21 may determine whether to perform control to increase or decrease the magnetic flux depending on the speed of the motor 200 or the magnetic flux in the motor 200 and may generate the current command for controlling the magnetic force in the motor 200 according to a result of the determination.

The control process of the current control unit 21 may be the same as shown in FIG. 14.

As shown in FIG. 14, the current control unit 21 may estimate the speed of the motor 200 and the magnetic flux in the motor 200 (P2) while the motor 200 is in operation (P1) and may determine whether to perform control to increase or decrease the magnetic force in the motor 200 on the basis of a result of the estimation (P3). Depending on a result of the determination, the current control unit 21 may generate the current command to control the magnetic force in the motor 200 (P4) or may maintain the speed control of the motor 200 (P5).

In this case, the determination of whether to perform control to increase or decrease the magnetic force (P3) may be performed by comparing the estimation result to a predetermined criterion.

The current control unit 21 may compare the estimation result to a predetermined state criterion and then determine whether to perform control to increase or decrease the magnetic force depending on a result of the determination.

The state criterion may be a criterion for the proper magnetic flux in the motor 200 according to the operating speed of the motor 200.

For example, the state criterion may be a table criterion such as x'[wb] in x[RPM] and y'[wb] in y[RPM].

The current control unit 21 may compare the estimated magnetic flux to the proper magnetic flux corresponding to the estimated speed of the state criterion and may determine whether to perform control to increase or decrease the magnetic flux depending on the difference between the estimated magnetic flux and the proper magnetic flux.

For example, when the speed of the motor 200 is x[RPM] and the magnetic flux in the motor 200 is z[wb], the current control unit 21 may compare the estimated magnetic flux z[wb] to the proper magnetic flux x'[wb] corresponding to x[RPM] of the state criterion and may determine whether to perform control to increase or decrease the magnetic flux depending on the difference between the estimated magnetic flux z[wb] and the proper magnetic flux x'[wb].

In more detail, when the estimated magnetic flux z[wb] is smaller than the proper magnetic flux x'[wb], the current control unit 21 may determine that the magnetic force in the motor 200 is weaker than a proper criterion and determine to perform control such that the magnetic force in the motor 200 is increased. On the other hand, when the estimated magnetic flux z[wb] is larger than the proper magnetic flux x'[wb], the current control unit 21 may determine that the magnetic force in the motor 200 is stronger than the proper criterion and determine to perform control such that the magnetic force in the motor 200 is decreased.

When the current control unit 21 determines to perform control such that the magnetic force in the motor 200 is increased, the current control unit 21 may generate the current command so that the magnetic flux in the motor 200 is increased. When the current control unit 21 determines to perform control such that the magnetic force in the motor 200 is decreased, the current control unit 21 may generate the current command so that the magnetic flux in the motor 200 is decreased.

The current control unit 21 may control the driving current applied to the stator 220 such that the increasing/decreasing current is applied to the stator 220 of the motor 200 and may increase or decrease the magnetic flux of the variable magnet 212 included in the rotator 210 of the motor 200 by using the increasing/decreasing current applied to the stator 220.

That is, when the current control unit 21 determines to perform control such that the magnetic force in the motor 200 is increased, the current control unit 21 generates a current command for controlling the driving current such that an increasing current for increasing the magnetic flux of the variable magnet 212 of the rotator 210 is applied to the stator 220. When the current control unit 21 determines to perform control such that the magnetic force in the motor 200 is decreased, the current control unit 21 may generate a current command for controlling the driving current such that a decreasing current for decreasing the magnetic flux of the variable magnet 212 of the rotator 210 is applied to the stator 220 and control the magnetic force in the motor 200.

The current control unit 21 may control a d-axis current of the driving current applied to the stator 220 such that the increasing/decreasing current is applied to the stator 220 and may increase or decrease the magnetic flux of the variable magnet 212 according to the increasing/decreasing current having the controlled d-axis current.

Here, the d-axis current may refer to a d-axis current which is a command value for controlling the magnetic flux in the motor 200 in the current command represented by a d-q axis current.

When the magnetic flux of the variable magnet 212 is increased, the current control unit 21 may control the d-axis current such that the magnetic flux generated by the increasing/decreasing current is in the same direction as the magnetic flux direction of the permanent magnet 211 included in the rotator 210. When the magnetic flux of the variable magnet 212 is decreased, the current control unit 21 may control the d-axis current such that the magnetic flux generated by the increasing/decreasing current is in the opposite direction to the magnetic flux direction of the permanent magnet 211.

The current control unit 21 may generate the current command so that the increasing/decreasing current is applied to the motor 200 at the application time point. In this case, the current control unit 21 may generate the current command so that the increasing/decreasing current is applied to the motor 200 according to a predetermined application condition.

That is, the increasing/decreasing current may be applied to the stator 220 of the motor 200 according to the application condition.

The application condition may be a criterion for an application time or an application period of the increasing/decreasing current.

The application time may be a time corresponding to the magnitude of the increasing/decreasing current for increasing or decreasing the magnetic flux in the motor 200.

That is, the application time may refer to a time it takes to increase the increasing/decreasing current up to the application magnitude while the increasing/decreasing current is applied.

The application time may be set to a time including the application time of the increasing/decreasing current and a time during which the application of the increasing/decreasing current is maintained.

For example, as shown in FIG. 15, a time offset including the application time of the increasing/decreasing current Id and a time α during which the application of the increasing/decreasing current Id is maintained may be set as an application time offset+α. The increasing/decreasing current Id may be applied at the application time point during the application time offset+α.

In this case, the current control unit 21 may generate the current command so that the increasing/decreasing current is applied at the application time. In this case, in consideration of the application time at the application time point, the current control unit 21 may generate the current command so that the increasing/decreasing current is applied at the time point at which the application time is considered.

Referring to FIG. 15, for example, the current control unit 21 may generate the current command so that the application of the increasing/decreasing current is started before the application time (at the starting time point of offset) such that a time point at which the increasing/decreasing current is increased to the maximum (at the ending time point of offset) is the application time point (60°, 120°, 180°, or 240°).

The application period may be a period for a time when the increasing/decreasing current is applied, the number of times the increasing/decreasing current is applied, or the number of times the application is repeated.

That is, the application period may refer to a method/process of applying the increasing/decreasing current to increase or decrease the magnetic flux in the motor 200.

The application period may be a control period during which the increasing/decreasing current is applied according to the application time point at least four times and the rotator 210 of the motor 200 is rotated four times or less with respect to the electrical angle between the time points at which the increasing/decreasing current is applied. In this case, the control period may be set to be repeated at least two times.

For example, as shown in FIG. 16, during the control period, the increasing/decreasing current Id may be applied with a magnitude of about 25[A] at the application time point 60°, 120°, 180°, or 240° at least four times, and the rotator 210 of the motor 200 may be rotated with respect to the electrical angle n (=4) times or less between the time points at which the increasing/decreasing current Id is applied. In this case, the control period may be set to be repeated at least two times, and thus the increasing/decreasing current Id may be applied at least a total of eight times while the magnetic force in the motor 200 is controlled.

As a detailed example, a first increasing/decreasing current is applied at a time point of 60°. After the rotator of the motor 200 is rotated four times or less, a second increasing/decreasing current is applied at a time point of 120°. After the rotator of the motor 200 is rotated four times or less, a third increasing/decreasing current is applied at a time point of 180°. After the rotator of the motor 200 is rotated four times or less, a fourth increasing/decreasing current is applied at a time point of 240°. By repeating the above process one more time, the current command may be generated so that the increasing/decreasing current is applied a total of eight times.

That is, by performing control not such that the increasing/decreasing current Id is continuously applied at every application time point 60°, 120°, 180°, or 240° but such that the rotator 210 of the motor 200 is rotated four times or less with respect to the electrical angle between the application time points and then the increasing/decreasing current Id is applied at the next time point, the current control unit 21 may apply the following increasing/decreasing current after the increasing or decreasing of the variable magnet 212 is stabilized by the previously applied increasing/decreasing current, and thus the increase or decrease in the magnetic flux may be stably made. Also, by performing control such that the above process is repeated one more time, the current control unit 21 may definitely increase or decrease the magnetic flux of the variable magnet 212.

<Motor Control Device>

The motor control device disclosed herein will be described below.

The motor control device disclosed herein may be implemented using some or a combination of the elements or steps included in the preceding and following embodiments or using a combination of the embodiments. The technical terms used herein are only used to describe specific embodiments and do not limit the spirit of the technology disclosed herein.

The motor control device (hereinafter referred to as a control device) may be a control device for controlling a variable magnetic motor.

The control device 100 may be a control device for controlling the operation of the motor and the magnetic force in the motor.

In a control system 1000 of a variable magnetic motor 200 (hereinafter referred to as a motor) as shown in FIG. 1, the control device 100 may be a control device for controlling the motor 200.

As shown in FIG. 1, the control device 100 includes an inverter unit 10 and a control unit 20.

Here, the control unit 20 may be the same as the control module 20 that has been described above.

That is, the control device 100 may include the control module 20 that has been described above and may control the operation of the motor 200.

In the following description, portions overlapping with that described for the control module 20 will be omitted as much as possible, and portions necessary for the embodiment of the control device 100 will be described again in detail.

The inverter unit 10 applies a driving current to the motor 200.

The inverter unit 10 may be a power conversion device configured to apply a driving current to the motor 200 and drive the motor 200.

The inverter 10 may include a plurality of switching devices and may convert direct current (DC) power into alternating current (AC) power under the control of the control unit 20.

The inverter unit 10 may convert DC power into three-phase AC power through switching operation of the plurality of switching devices under the control of the control unit 20 and may apply a driving current to the motor 200.

The inverter unit 10 may operate on the basis of a control signal generated by the control unit 20.

That is, the inverter unit 10 may be controlled by the control signal generated by the control unit 20.

The control unit 20 controls the inverter unit 10 to control the driving current.

The control unit 20 may control the driving current to control the operation of the motor 200.

The control unit 20 may estimate or detect an operating state of the motor 200 and may control the operation of the motor 200 on the basis of a result of the estimation or the detection.

The control unit 20 may estimate or detect an operating state of the motor 200 and may control the operation of the motor 200 on the basis of a result of the estimation or the detection.

That is, by controlling the operation of the inverter unit 10, the control unit 20 may control the driving current applied to the motor 200 to control the operation of the motor 200.

As shown in FIG. 2, the control unit 20 may include a current control unit 21 configured to generate a current command for controlling the driving current according to the operating state of the motor 200 and a signal generation unit 22 configured to generate a control signal for controlling the inverter 10 according to the current command and apply the control signal to the inverter 10.

Also, the control unit 20 may include the current control unit 21 and the signal generation unit 22, as shown in FIG. 3, and may further include a speed control unit 21a, a current detection unit 21b, a position estimation unit 21c, and a magnetic flux estimation unit 21d.

The speed control unit 21a may generate a speed command for controlling the speed of the motor 200 on the basis of the operating state of the motor 200 or an instruction input from the outside. The current detection unit 21b may detect the driving current applied to the motor 200. The position estimation unit 21c and the magnetic flux estimation unit 21d may estimate the position of the motor 200 and the magnetic flux in the motor 200 on the basis of a result of the detection by the current detection unit 21b.

The control device 100 includes the inverter unit 10 and the control unit 20 and controls the operation of the motor 200 and the magnetic force in the motor 200.

For the motor 200 controlled by the control device 100, the magnetic force in the motor 200 may be varied by increasing or decreasing the magnetic flux in the motor 200 under the control of the control device 100.

As shown in FIG. 4, the motor 200 may include a rotator 210 which includes a variable magnet and a stator 220 to which the increasing/decreasing current for increasing or decreasing the magnetic flux of the variable magnet is to be applied.

The rotator 210 may include one or more permanent magnets and one or more variable magnets having the magnetic flux increasing or decreasing due to the influence of the increasing/decreasing current, and the stator 220 may include one or more coil slots to which the increasing/decreasing current is to be applied.

That is, the motor 200 may be composed of the rotator 210 including one or more variable magnets and the stator 220 having a coil to which the increasing/decreasing current is to be applied.

The motor 200 may include the rotator and the stator 220, and the magnetic force of the motor 200 may be varied by increasing or decreasing the magnetic flux of the variable magnet under the control of the control device 100.

That is, the magnetic flux in the motor 200 may be the magnetic flux of the variable magnet, and the magnetic force in the motor 200 may be a magnetic force caused by the magnetic flux of the variable magnet.

The magnetic force of the motor 200 may be varied by increasing or decreasing the magnetic flux of the variable magnet of the rotator 210 using the driving current applied to the stator 220.

The motor 200 may have a structure in which the ratio between the number of poles of the rotator 210 and the number of slots of the stator 220 is 4:3.

In the control device 100 for controlling the operation of the motor 200 and the magnetic force in the motor 200, the control unit 20 controls the magnetic force in the motor 200 by controlling the driving current such that an increasing/decreasing current for increasing or decreasing the magnetic flux in the motor 200 at a predetermined application time point is applied to the motor 200.

That is, by controlling the driving current such that the increasing/decreasing current applied to the stator 220 is applied at the application time point to increase or decrease the magnetic flux in the motor 200, the control unit 20 may control the magnetic force in the motor 200.

The application time point may be a time point corresponding to the position of the rotator 210 of the motor 200.

The application time point may be set to time points of positions where the electrical angle between the rotator 210 and the stator 220 of the motor 200 is 60°, 120°, 180°, and 240°.

That is, the control unit 20 may control the magnetic force in the motor 200 by performing control such that the increasing/decreasing current is applied to the stator 220 at the time points of the positions where the electrical angle between the rotator 210 and the stator 220 of the motor 200 is 60°, 120°, 180°, and 240°.

The control unit 20 may control the magnetic force in the motor 200 by controlling the driving current such that the increasing/decreasing current is applied. In this case, the control unit 20 may estimate the speed of the motor 200 and the magnetic flux in the motor 200, determine whether to perform control to increase or decrease the magnetic force in the motor 200 on the basis of a result of the estimation, and control the magnetic force in the motor 200 according to a result of the determination.

That is, as shown in FIG. 14, the control unit 20 may estimate the speed of the motor 200 and the magnetic flux in the motor 200 (P2) while the motor 200 is in operation (P1) and may determine whether to perform control to increase or decrease the magnetic force in the motor 200 on the basis of a result of the estimation (P3). Depending on a result of the determination, the control unit 20 may control the driving current to control the magnetic force in the motor 200 (P4) or may maintain the speed control of the motor 200 (P5).

When the control unit 20 determines whether to perform control to increase or decrease the magnetic force (P3), the control unit 20 may compare the estimation result to a predetermined state criterion and then determine whether to perform control to increase or decrease the magnetic flux depending on a result of the comparison.

The state criterion may be a criterion for the proper magnetic flux in the motor 200 according to the operating speed of the motor 200.

The control unit 20 may compare the estimated magnetic flux to the proper magnetic flux corresponding to the estimated speed of the state criterion and may determine whether to perform control to increase or decrease the magnetic flux depending on the difference between the estimated magnetic flux and the proper magnetic flux.

When the control unit 20 determines to perform control such that the magnetic force in the motor 200 is increased, the control unit 20 may control the driving current such that the magnetic flux in the motor 200 is increased. When the control unit 20 determines to perform control such that the magnetic force in the motor 200 is decreased, the control unit 20 may control the driving current such that the magnetic flux in the motor 200 is decreased.

That is, when the control unit 20 determines to perform control such that the magnetic force in the motor 200 is increased, the control unit 20 may control the driving current such that an increasing current for increasing the magnetic flux in the motor 200 is applied. When the control unit 20 determines to perform control such that the magnetic force in the motor 200 is decreased, the control unit 20 may control the driving current such that a decreasing current for decreasing the magnetic flux in the motor 200 is applied.

The control unit 20 may control the driving current applied to the stator 220 such that the increasing/decreasing current is applied to the stator 220 of the motor 200 and may increase or decrease the magnetic flux of the variable magnet included in the rotator 210 of the motor 200 by using the increasing/decreasing current applied to the stator 220.

That is, when the control unit 20 determines to perform control such that the magnetic force in the motor 200 is increased, the control unit 20 may control the driving current such that an increasing current for increasing the magnetic flux of the variable magnet is applied to the stator 220. When the control unit 20 determines to perform control such that the magnetic force in the motor 200 is decreased, the control unit 20 may control the driving current such that a decreasing current for decreasing the magnetic flux of the variable magnet is applied to the stator 220.

The control unit 20 may control a d-axis current of the driving current applied to the stator 220 such that the increasing/decreasing current is applied to the stator 220 and may increase or decrease the magnetic flux of the variable magnet according to the increasing/decreasing current having the controlled d-axis current.

That is, the increasing/decreasing current may be a d-axis current component of the driving current applied to the stator 220, and the control unit 20 may apply the increasing/decreasing current to the stator 220 by controlling the d-axis current of the driving current.

Here, the d-axis current may refer to a d-axis component current for controlling the magnetic flux in the motor 200 in the current command of the driving current represented by a d-q axis current.

When the magnetic flux of the variable magnet is increased, the control unit 20 may control the d-axis current such that the magnetic flux generated by the increasing/decreasing current is in the same direction as the magnetic flux direction of the permanent magnet included in the rotator 210. When the magnetic flux of the variable magnet is decreased, the control unit 20 may control the d-axis current such that the magnetic flux generated by the increasing/decreasing current is in the opposite direction to the magnetic flux direction of the permanent magnet.

The control unit 20 may control the driving current such that the increasing/decreasing current is applied to the motor 200 at the application time point. In this case, the control unit 20 may control the driving current such that the increasing/decreasing current is applied to the motor 200 according to a predetermined application condition.

That is, the increasing/decreasing current may be applied to the stator 220 of the motor 200 according to the application condition.

The application condition may be a criterion for an application time or an application period of the increasing/decreasing current.

The application time may be a time corresponding to the magnitude of the increasing/decreasing current for increasing or decreasing the magnetic flux in the motor 200.

The application time may be set to a time including the application time of the increasing/decreasing current and a time during which the application of the increasing/decreasing current is maintained.

For example, as shown in FIG. 15, a time offset including the application time of the increasing/decreasing current Id and a time α during which the application of the increasing/decreasing current Id is maintained may be set as an application time offset+α. The control unit 20 may perform control such that the increasing/decreasing current Id is applied at the application time point during the application time offset+α.

In this case, the control unit 20 may control the driving current such that the increasing/decreasing current is applied according to the application time. In this case, in consideration of the application time at the application time point, the control unit 20 may control the driving current such that the increasing/decreasing current is applied at the time point at which the application time is considered.

The application period may be a period for a time when the increasing/decreasing current is applied, the number of times the increasing/decreasing current is applied, or the number of times the application is repeated.

The application period may be a control period during which the increasing/decreasing current is applied according to the application time point at least four times and the rotator 210 of the motor 200 is rotated four times or less with respect to the electrical angle between the time points at which the increasing/decreasing current is applied. In this case, the control period may be set to be repeated at least two times.

For example, as shown in FIG. 16, during the control period, the increasing/decreasing current Id may be applied with a magnitude of about 25[A] at the application time point 60°, 120°, 180°, or 240° at least four times, and the rotator 210 of the motor 200 may be rotated with respect to the electrical angle n (=4) times or less between the time points at which the increasing/decreasing current Id is applied. In this case, the control period may be set to be repeated at least two times, and thus the control unit 20 may perform control such that the increasing/decreasing current Id is applied at least a total of eight times while the magnetic force in the motor 200 is controlled.

That is, by performing control not such that the increasing/decreasing current Id is continuously applied at every application time point 60°, 120°, 180°, or 240° but such that the rotator 210 of the motor 200 is rotated four times or less with respect to the electrical angle between the application time points and then the increasing/decreasing current Id is applied at the next time point, the control unit 20 may apply the following increasing/decreasing current after the increasing or decreasing of the variable magnet is stabilized by the previously applied increasing/decreasing current, and thus the increase or decrease in the magnetic flux may be stably made. Also, by performing control such that the above process is repeated one more time, the control unit 20 may definitely increase or decrease the magnetic flux of the variable magnet.

<Motor Control System>

The motor control system disclosed herein will be described below.

The motor control system disclosed herein may be implemented using some or a combination of the elements or steps included in the preceding and following embodiments or using a combination of the embodiments. The technical terms used herein are only used to describe specific embodiments and do not limit the spirit of the technology disclosed herein.

The motor control system (hereinafter referred to as a control system) may be a system for controlling a variable magnetic motor.

The control system 1000 may be a control system for controlling the operation of the variable magnetic motor and the magnetic force in the motor.

As shown in FIG. 1, the control system 1000 includes a variable magnetic motor 200 and a control device 100 for controlling the variable magnetic motor 200.

Here, the control device 100 may be the same as the control device 100 that has been described above.

That is, the control system may include the above-described control device 100 and may control the operation of the motor 200.

In the following description, portions overlapping with that described for the control module 20 and the control device 100 will be omitted as much as possible, and portions necessary for the embodiment of the control system 1000 will be described again in detail.

In the control system 1000, the control device 100 applies a driving current to the motor 200 and controls the operation of the motor 200.

The control device 100 may include an inverter unit 10 for applying a driving current to the motor 200 and a control unit 20 for controlling the inverter unit 10 to control the driving current to the control unit 20.

As shown in FIG. 2, the control unit 20 may include a current control unit 21 configured to generate a current command for controlling the driving current according to the operating state of the motor 200 and a signal generation unit 22 configured to generate a control signal for controlling the inverter 10 according to the current command and apply the control signal to the inverter 10.

Also, the control unit 20 may include the current control unit 21 and the signal generation unit 22, as shown in FIG. 3, and may further include a speed control unit 21a, a current detection unit 21b, a position estimation unit 21c, and a magnetic flux estimation unit 21d.

The speed control unit 21a may generate a speed command for controlling the speed of the motor 200 on the basis of the operating state of the motor 200 or an instruction input from the outside. The current detection unit 21b may detect the driving current applied to the motor 200. The position estimation unit 21c and the magnetic flux estimation unit 21d may estimate the position of the motor 200 and the magnetic flux in the motor 200 on the basis of a result of the detection by the current detection unit 21b.

The control device 100 includes the inverter unit 10 and the control unit 20 and controls the operation of the motor 200 and the magnetic force in the motor 200.

As shown in FIG. 4, the motor 200 in the control system 1000 may include a rotator 210 which includes a variable magnet and a stator 220 for increasing or decreasing the variable magnet according to an applied current.

That is, the magnetic force in the motor 200 may be varied by increasing or decreasing the magnetic flux of the variable magnet under the control of the control device 100.

In the motor 200, the rotator 210 may include one or more permanent magnets and one or more variable magnets having the magnetic flux increasing or decreasing due to the influence of the increasing/decreasing current, and the stator 220 may include one or more coil slots to which the increasing/decreasing current is to be applied.

An example in which the magnetic force in the motor 200 is controlled by the increasing/decreasing current will be described as follows.

FIG. 5 is a diagram showing a simplified structure of the motor 200 as shown in FIG. 4. The rotator 210 may have an upper portion 211 composed of permanent magnets and a lower portion 212 composed of variable magnets. Among the magnets of the rotator 210, magnets 1, 3, 4, and 6 shown with upward diagonals may correspond to N-pole magnets, and magnets 2, 5, and 7 shown with downward diagonals may correspond to S-pole magnets.

When the increasing/decreasing current is applied to each coil of the stator 220 in the structure as shown in FIG. 5, the magnetic flux is generated in the variable magnet 212 along the direction of the increasing/decreasing current. Along with a change in the magnetic flux of the variable magnet 212, the magnetic force of the rotator 210 may be increased or decreased.

In an example of performing control such that the magnetic force of the rotator 210 is increased, as shown in FIG. 6, by applying the increasing/decreasing current to each coil of the stator 220 in the same direction as the magnetic flux direction of the permanent magnet 211 such that the magnetic flux generated in the variable magnet 212 due to the increasing/decreasing current is in the same direction as the magnetic flux direction of the permanent magnet 211 and thus by increasing the magnetic flux of the variable magnet 212 through the magnetic flux generated in the same direction, the magnetic force of the rotator 210 may be increased.

In an example of performing control such that the magnetic force of the rotator 210 is decreased, as shown in FIG. 7, by applying the increasing/decreasing current to each coil of the stator 220 in the opposite direction to the magnetic flux direction of the permanent magnet 211 such that the magnetic flux generated in the variable magnet 212 due to the increasing/decreasing current is in the opposite direction to the magnetic flux direction of the permanent magnet 211 and thus by decreasing the magnetic flux of the variable magnet 212 through the magnetic flux generated in the opposite direction, the magnetic force of the rotator 210 may be decreased.

The motor 200 may have a structure in which the ratio between the number of poles of the rotator 210 and the number of slots of the stator 220 is 4:3.

The control device 100 for controlling the operation of the motor 200 having the above configuration and the magnetic force in the motor 200 estimates the speed of the motor 200 and the magnetic flux in the motor 200, determines whether to perform control to increase or decrease the magnetic force in the motor 200 on the basis of a result of the estimation, and applies an increasing/decreasing current for increasing or decreasing the magnetic flux of the variable magnet to the stator 220 at a predetermined application time point according to a result of the determination to control the magnetic force in the motor 200.

The application time point may correspond to time points of positions where the electrical angle between the rotator 210 and the stator 220 is 60°, 120°, 180°, and 240°.

That is, as shown in FIG. 8, the control device 100 may control the magnetic force in the motor 200 by applying the increasing/decreasing current to the stator 220 at the time points of the positions where the electrical angle between the rotator 210 and the stator 220 of the motor 200 is 60°, 120°, 180°, and 240°.

This is set according to a structure in which the ratio between the number of poles of the rotator 210 and the number of slots of the stator 220 is 4:3. That is, the application time point set as the time points of the positions where the electrical angle between the rotator 210 and the stator 220 of the motor 200 is 60°, 120°, 180°, and 240° may be optimized for a motor having the structure in which the ratio between the number of poles of the rotator 210 and the number of slots of the stator 220 is 4:3.

Specific examples in which the increasing/decreasing current is applied at each of the application time points will be described below with reference to FIGS. 9 to 13.

FIG. 9 shows a reference position of the rotator 210 and the stator 220. FIG. 10 shows a position where the electrical angle between the rotator 210 and the stator 220 of the motor 200 is 60°. FIG. 11 shows a position where the electrical angle between the rotator 210 and the stator 220 of the motor 200 is 120°. FIG. 12 shows a position where the electrical angle between the rotator 210 and the stator 220 of the motor 200 is 180°. FIG. 13 shows a position where the electrical angle between the rotator 210 and the stator 220 of the motor 200 is 240°.

When the increasing/decreasing current is applied to the coil of the stator 220 at the application time point, the motor 200 may be rotated at the positions of the rotator 210 and the stator 220 as shown in FIG. 9. When the electrical angle between the rotator 210 and the stator 220 of the motor 200 becomes 60° as shown in FIG. 10, a first increasing/decreasing current may be applied to a coil corresponding to the V-phase of the stator 220. When the electrical angle between the rotator 210 and the stator 220 of the motor 200 becomes 120° as shown in FIG. 11, a second increasing/decreasing current may be applied to a coil corresponding to the W-phase of the stator 220. When the electrical angle between the rotator 210 and the stator 220 of the motor 200 becomes 180° as shown in FIG. 12, a third increasing/decreasing current may be applied to a coil corresponding to the U-phase of the stator 220. When the electrical angle between the rotator 210 and the stator 220 of the motor 200 becomes 240° as shown in FIG. 13, a fourth increasing/decreasing current may be applied to a coil corresponding to the V-phase of the stator 220.

In this case, the increasing/decreasing current applied to each of the application time points may be applied as a current in the direction for increasing or decreasing the magnetic flux of the variable magnet 212 depending on whether to perform control to increase or decrease the magnetic force in the motor 200.

Also, in this case, the increasing/decreasing current may be applied with a magnitude sufficient to increase or decrease the magnetic flux of the variable magnet 212.

For example, as shown in FIG. 8, the increasing/decreasing current may be applied with a magnitude of about 25 [A].

The application time point may be differently set depending on the structure of the motor 200.

The control device 100 may compare the estimation result to a predetermined state criterion, determine whether to perform control to increase or decrease the magnetic flux depending on a result of the comparison, and apply the increasing/decreasing current to the stator 220 according to a result of the determination.

The state criterion may be a criterion for the proper magnetic flux in the motor 200 according to the operating speed of the motor 200.

The control device 100 may compare the estimated magnetic flux to the proper magnetic flux corresponding to the estimated speed of the state criterion and may determine whether to perform control to increase or decrease the magnetic flux depending on the difference between the estimated magnetic flux and the proper magnetic flux.

When the control device 100 determines to perform control such that the magnetic force in the motor 200 is increased, the control device 100 may apply the increasing/decreasing current to the stator 220 to increase the magnetic force of the variable magnet. When the control device 100 determines to perform control such that the magnetic force in the motor 200 is decreased, the control device 100 may apply the increasing/decreasing current to the stator 220 to decrease the magnetic flux of the variable magnet.

The control device 100 may control the driving current applied to the stator 220 such that the increasing/decreasing current is applied to the stator 220 and may increase or decrease the magnetic flux of the variable magnet through the magnetic flux generated in the stator 220 due to the increasing/decreasing current.

That is, when the control device 100 determines to perform control such that the magnetic force in the motor 200 is increased, the control device 100 may apply an increasing current for increasing the magnetic flux of the variable magnet to the stator 220. When the control device 100 determines to perform control such that the magnetic force in the motor 200 is decreased, the control device 100 may apply a decreasing current for decreasing the magnetic flux of the variable magnet to the stator 220.

The control device 100 may control a d-axis current of the driving current such that the increasing/decreasing current is applied to the stator 220 and may increase or decrease the magnetic flux of the variable magnet according to the increasing/decreasing current having the controlled d-axis current.

That is, the increasing/decreasing current may be a d-axis current component of the driving current applied to the stator 220, and the control unit 20 may apply the increasing/decreasing current to the stator 220 by controlling the d-axis current of the driving current.

When the magnetic flux of the variable magnet is increased, the control device 100 may control the d-axis current such that the magnetic flux generated in the stator 220 by the increasing/decreasing current is in the same direction as the magnetic flux direction of the permanent magnet included in the rotator 210. When the magnetic flux of the variable magnet is decreased, the control device 100 may control the d-axis current such that the magnetic flux generated in the stator 220 by the increasing/decreasing current is in the opposite direction to the magnetic flux direction of the permanent magnet.

The control device 100 may apply the increasing/decreasing current to the stator 220 at the application time point and may apply the increasing/decreasing current to the stator 220 according to a predetermined application condition.

The application condition may be a criterion for an application time or an application period of the increasing/decreasing current.

The application time may be a time corresponding to the magnitude of the increasing/decreasing current for increasing or decreasing the magnetic flux of the variable magnet.

The application time may be set to a time including the application time of the increasing/decreasing current and a time during which the application of the increasing/decreasing current is maintained.

For example, as shown in FIG. 15, a time offset including the application time of the increasing/decreasing current Id and a time α during which the application of the increasing/decreasing current Id is maintained may be set as an application time offset+α. The increasing/decreasing current Id may be applied at the application time point during the application time offset+α.

In this case, the control device 100 may apply the increasing/decreasing current according to the application time. In this case, in consideration of the application time at the application time point, the control device 100 may apply the increasing/decreasing current at the time point at which the application time is considered.

The application period may be a period for a time when the increasing/decreasing current is applied, the number of times the increasing/decreasing current is applied, or the number of times the application is repeated.

The application period may be a control period during which the increasing/decreasing current is applied according to the application time point at least four times and the rotator 210 is rotated four times or less with respect to the electrical angle between the time points at which the increasing/decreasing current is applied. In this case, the control period may be set to be repeated at least two times.

For example, as shown in FIG. 16, during the control period, the increasing/decreasing current Id may be applied with a magnitude of about 25[A] at the application time point 60°, 120°, 180°, or 240° at least four times, and the rotator 210 of the motor 200 may be rotated with respect to the electrical angle n (=4) times or less between the time points at which the increasing/decreasing current Id is applied. In this case, the control period may be set to be repeated at least two times, and thus the increasing/decreasing current Id may be applied at least a total of eight times while the magnetic force in the motor 200 is controlled.

That is, not by continuously applying the increasing/decreasing current Id at every application time point 60°, 120°, 180°, or 240° but by applying the increasing/decreasing current Id at the next time point after the rotator 210 is rotated four times or less with respect to the electrical angle between the application time points, the control device 100 may apply the following increasing/decreasing current after the increasing or decreasing of the variable magnet is stabilized by the previously applied increasing/decreasing current, and thus the increase or decrease in the magnetic flux may be stably made. Also, by performing control such that the above process is repeated one more time, the control device 100 may definitely increase or decrease the magnetic flux of the variable magnet.

<Motor Control Method>

The motor control method disclosed herein will be described below.

The motor control method disclosed herein may be implemented using some or a combination of the elements or steps included in the preceding and following embodiments or using a combination of the embodiments. The technical terms used herein are only used to describe specific embodiments and do not limit the spirit of the technology disclosed herein.

The motor control method (hereinafter referred to as a control method) may be a control method for controlling a variable magnetic motor.

The control method may be a control method for a control device for controlling the motor, a driving device, and also a control means.

The control method may be a control method for controlling the operation of the motor and the magnetic force in the motor.

The control method may be a control method for controlling the operation of the motor and the magnetic force in the motor while the motor is being driven.

The control method may be a control method of the control module 20, the control device 100, and the control system 1000 that have been described above.

In the following description, portions overlapping with that described for the control module 20, the control device 100, and the control system 1000 will be omitted as much as possible, and portions necessary for the embodiment of the control system 1000 will be described again in detail.

The control method controls the operation of the variable magnetic motor 200 and the magnetic force in the motor 200 as shown in FIG. 4.

As shown in FIG. 17, the control method includes the steps of: estimating the speed of the motor 200 and the magnetic flux in the motor 200 while the motor 200 is in operation (S10), comparing the magnetic flux in the motor 200 to a predetermined magnetic flux reference and determining whether to perform control to increase or decrease the magnetic force in the motor 200 when the speed of the motor 200 reaches a predetermined speed reference (S20), and controlling a driving current applied to the motor 200 such that the magnetic force in the motor 200 is increased or decreased depending on a result of the determination (S30). The controlling step (S30) includes controlling the driving current applied at a predetermined application time point to increase or decrease the magnetic flux in the motor 200.

Here, as shown in FIG. 4, the motor 200 may include a rotator 210 including a variable magnet and a stator 220 for increasing or decreasing the magnetic flux of the variable magnet due to the driving current, and the motor 200 may have a structure in which the ratio between the number of poles of the rotator 210 and the number of slots of the stator 220 is 4:3.

An example in which the magnetic force in the motor 200 is controlled by the driving current will be described as follows.

FIG. 5 is a diagram showing a simplified structure of the motor 200 as shown in FIG. 4. The rotator 210 may have an upper portion 211 composed of permanent magnets and a lower portion 212 composed of variable magnets. Among the magnets of the rotator 210, magnets 1, 3, 4, and 6 shown with upward diagonals may correspond to N-pole magnets, and magnets 2, 5, and 7 shown with downward diagonals may correspond to S-pole magnets.

When the driving current is applied to each coil of the stator 220 in the structure as shown in FIG. 5, the magnetic flux is generated in the variable magnet 212 along the direction of the driving current. Along with a change in the magnetic flux of the variable magnet 212, the magnetic force of the rotator 210 may be increased or decreased.

In an example of performing control such that the magnetic force of the rotator 210 is increased, as shown in FIG. 6, by applying the driving current to each coil of the stator 220 in the same direction as the magnetic flux direction of the permanent magnet 211 such that the magnetic flux generated in the variable magnet 212 due to the driving current is in the same direction as the magnetic flux direction of the permanent magnet 211 and thus by increasing the magnetic flux of the variable magnet 212 through the magnetic flux generated in the same direction, the magnetic force of the rotator 210 may be increased.

In an example of performing control such that the magnetic force of the rotator 210 is decreased, as shown in FIG. 7, by applying the driving current to each coil of the stator 220 in the opposite direction to the magnetic flux direction of the permanent magnet 211 such that the magnetic flux generated in the variable magnet 212 due to the driving current is in the opposite direction to the magnetic flux direction of the permanent magnet 211 and thus by decreasing the magnetic flux of the variable magnet 212 through the magnetic flux generated in the opposite direction, the magnetic force of the rotator 210 may be decreased.

That is, the control method may include controlling the magnetic force in the motor 200 by controlling the driving current applied to the stator 220 such that the magnetic force is generated in the same direction as the magnetic flux direction of the variable magnet 212 when control is performed such that the magnetic force in the motor 200 is increased and by controlling the driving current applied to the stator 220 such that the magnetic force is generated in the opposite direction to the magnetic flux direction of the variable magnet 212 when control is performed such that the magnetic force in the motor 200 is decreased.

The estimation step (S10) may be a step of estimating the operating state of the magnetic flux in the motor 200 and the speed of the motor 200.

In the estimation step (S10), the driving current applied to the motor 200 may be detected, and the speed of the motor 200 and the magnetic flux in the motor 200 may be estimated on the basis of a result of the detection.

That is, the estimation step (S10) may be a step of estimating the operating state of the motor 200 in a sensorless control scheme, and the control method may be a sensorless control method.

In the determination step (S20), when a result of estimating the speed of the motor 200 and the magnetic flux in the motor 200 in the estimation step (S10) is that the speed of the motor 200 reaches the speed reference, the magnetic flux in the motor may be compared to the magnetic flux reference, and whether to perform control to increase or decrease the magnetic force may be determined depending on a result of the comparison.

Here, the magnetic force in the motor 200 may be a magnetic force caused by the variable magnet included in the rotator 210 of the motor 200.

The speed reference may be a criterion for speed while the motor 200 is in operation.

The speed reference may be a criterion for speed required to control the magnetic force in the motor 200.

The speed reference may include one or more speed references.

For example, the speed references may be set to be table criteria as x[RPM] and y[RPM].

The magnetic flux reference may be a criterion for magnetic flux in the motor 200.

The magnetic flux reference may be a criterion for proper magnetic flux in the motor 200 according to the speed reference.

For the magnetic flux reference, a proper magnetic flux reference may be set for each of one or more speed references.

For example, the magnetic flux references may be set to be table criteria as x'[wb] in x[RPM] and y'[wb] in y[RPM].

In the determination step (S20), when the difference between the magnetic flux in the motor 200 and the magnetic flux reference is greater than or equal to a predetermined reference value, it may be determined that the increase or decrease in the magnetic force in the motor 200 is necessary.

For example, when the speed of the motor 200 is x[RPM] and the magnetic flux in the motor 200 is z[wb], the estimated magnetic flux z[wb] may be compared to the magnetic flux reference x'[wb] corresponding to x[RPM] of the speed reference, the difference between the estimated magnetic flux z[wb] and the magnetic flux reference x'[wb] may be compared to the reference value, and whether to perform control to increase or decrease the magnetic force may be determined depending on a result of the comparison.

In more detail, when the difference |z− x'| between the estimated magnetic flux z[wb] and the magnetic flux reference x'[wb] is smaller than the reference value, it may be determined that the magnetic flux in the motor 200 is proper. When the difference |z−x'| between the estimated magnetic flux z[wb] and the magnetic flux reference x'[wb] is greater than the reference value, it may be determined that the magnetic flux in the motor 200 is not proper and thus control is necessary to increase or decrease the magnetic force. In this case, depending on the difference between the reference value and the difference |z−x'| between the estimated magnetic flux z[wb] and the magnetic flux reference x'[wb], it may be determined that the increase or decrease of the magnetic force in the motor 200 is necessary.

In the step of controlling the driving current (S30), the driving current may be controlled to increase or decrease the magnetic force in the motor 200 depending on a result of determining whether to perform control to increase or decrease the magnetic force.

In the step of controlling the driving current (S30), the magnetic flux in the motor 200 is increased or decreased by controlling the driving current applied at the application time point according to a result of the determination.

That is, in the step of controlling the driving current (S30), the magnetic force in the motor 200 may be controlled by controlling the driving current applied at the application time point to increase or decrease the magnetic flux in the motor 200.

The application time point may be a time point corresponding to the position of the rotator 210 of the motor 200.

The application time point may be set to time points of positions where the electrical angle between the rotator 210 and the stator 220 of the motor 200 is 60°, 120°, 180°, and 240°.

That is, as shown in FIG. 8, in the step of controlling the driving current (S30), the magnetic force in the motor 200 may be controlled by controlling the driving current applied to the stator 220 at the time points of the positions where the electrical angle between the rotator 210 and the stator 220 of the motor 200 is 60°, 120°, 180°, and 240°.

This is set according to a structure in which the ratio between the number of poles of the rotator 210 and the number of slots of the stator 220 is 4:3. That is, the application time point set as the time points of the positions where the electrical angle between the rotator 210 and the stator 220 of the motor 200 is 60°, 120°, 180°, and 240° may be optimized for a motor having the structure in which the ratio between the number of poles of the rotator 210 and the number of slots of the stator 220 is 4:3.

An example in which the driving current is applied at the application time point will be described below with reference to FIGS. 9 to 13.

FIG. 9 shows a reference position of the rotator 210 and the stator 220. FIG. 10 shows a position where the electrical angle between the rotator 210 and the stator 220 of the motor 200 is 60°. FIG. 11 shows a position where the electrical angle between the rotator 210 and the stator 220 of the motor 200 is 120°. FIG. 12 shows a position where the electrical angle between the rotator 210 and the stator 220 of the motor 200 is 180°. FIG. 13 shows a position where the electrical angle between the rotator 210 and the stator 220 of the motor 200 is 240°.

When the driving current is applied to the coil of the stator 220 at each application time point, the motor 200 may be rotated at the positions of the rotator 210 and the stator 220 as shown in FIG. 9. When the electrical angle between the rotator 210 and the stator 220 of the motor 200 becomes 60° as shown in FIG. 10, the driving current applied to the coil corresponding to the V-phase of the stator 220 may be controlled to generate the magnetic flux in the same direction as that of the rotator 210. When the electrical angle between the rotator 210 and the stator 220 of the motor 200 becomes 120° as shown in FIG. 11, the driving current applied to the coil corresponding to the W-phase of the stator 220 may be controlled to generate the magnetic flux in the opposite direction to that of the rotator 210. When the electrical angle between the rotator 210 and the stator 220 of the motor 200 becomes 180° as shown in FIG. 12, the driving current applied to the coil corresponding to the U-phase of the stator 220 may be controlled to generate the magnetic flux in the same direction as that of the rotator 210. When the electrical angle between the rotator 210 and the stator 220 of the motor 200 becomes 240° as shown in FIG. 13, the driving current applied to the coil corresponding to the V-phase of the stator 220 may be controlled to generate the magnetic flux in the opposite direction to that of the rotator 210.

In this case, the driving current applied to each of the application time points may be controlled to be applied in the direction for increasing or decreasing the magnetic flux of the variable magnet of the rotator 210 depending on whether to perform control to increase or decrease the magnetic force in the motor 200.

Also, in this case, the driving current may be applied with a magnitude sufficient to increase or decrease the magnetic flux of the variable magnet.

For example, as shown in FIG. 8, the driving current may be applied with a magnitude of about 25 [A].

The application time point may be differently set depending on the structure of the motor 200.

In the step of controlling the driving current (S30), when it is determined in the determination step (S20) to perform control such that the magnetic force in the motor 200 is increased, the driving current may be controlled to increase the magnetic force in the motor 200. When it is determined in the determination step S20 to perform control such that the magnetic force in the motor 200 is decreased, the driving current may be controlled to decrease the magnetic force in the motor 200.

In the step of controlling the driving current (S30), when it is determined in the determination step (S20) to perform control such that the magnetic force in the motor 200 is increased, the driving current may be controlled to increase the magnetic flux in the motor 200. When it is determined in the determination step S20 to perform control such that the magnetic force in the motor 200 is decreased, the driving current may be controlled to decrease the magnetic flux in the motor 200.

In the step of controlling the driving current (S30), a d-axis current of the driving current applied to the stator 220 of the motor 200 may be controlled to increase or decrease the magnetic flux of the variable magnet included in the rotator 210 of the motor 200.

That is, the step of controlling the driving current (S30) is a step of controlling the d-axis current, and the magnetic force in the motor 200 may be controlled by controlling the d-axis current.

Here, the d-axis current may refer to a d-axis component current for controlling the magnetic flux in the motor 200 in the driving current represented by a d-q axis current.

In the step of controlling the driving current (S30), the magnetic flux of the variable magnet may be increased by controlling the d-axis current such that the magnetic flux generated by the driving current is in the same direction as the magnetic flux direction of the permanent magnet included in the rotator 210 when the magnetic force in the motor 200 is increased, and the magnetic flux of the variable magnet may be decreased by controlling the d-axis current such that the magnetic flux generated by the driving current is in the opposite direction to the magnetic flux direction of the permanent magnet when the magnetic force in the motor 200 is decreased.

That is, in the step of controlling the driving current (S30), the magnetic force in the motor 200 may be controlled by controlling the d-axis current such that the magnetic flux is generated in the same direction as or in the opposite direction to the magnetic flux direction of the permanent magnet included in the rotator 210 by the driving current to increase or decrease the magnetic flux of the variable magnet depending on whether to perform control to increase or decrease the magnetic force.

In the step of controlling the driving current (S30), the magnetic force in the motor 200 may be controlled by controlling the d-axis current of the driving current. In this case, the driving current may be controlled according to a predetermined application condition.

The application condition may be a criterion for an application time or an application period of the driving current.

The application time may be a time corresponding to the magnitude of the driving current for increasing or decreasing the magnetic flux of the variable magnet.

The application time may be set to a time including the application time of the driving current and a time during which the application of the driving current is maintained.

For example, as shown in FIG. 15, a time offset including the application time of the driving current having the controlled d-axis current Id and a time α during which the application of the driving current having the controlled d-axis current Id is maintained may be set as an application time offset+α. The driving current having the controlled d-axis current Id may be applied at the application time point during the application time offset+α.

In this case, in the step of controlling the driving current (S30), the driving current may be controlled to apply the driving current at the application time. In this case, in consideration of the application time at the application time point, the driving current may be controlled to be applied at the time point at which the application time is considered.

The application period may be a period for a time when the driving current is applied, the number of times the driving current is applied, or the number of times the application is repeated.

The application period may be a control period during which the driving current is applied according to the application time point at least four times and the rotator 210 of the motor 200 is rotated with respect to the electrical angle between the time points at which the driving current is applied four times or less. In this case, the control period may be set to be repeated at least two times.

For example, as shown in FIG. 16, during the control period, the driving current having the controlled d-axis current Id may be applied with a magnitude of about 25[A] at the application time point 60°, 120°, 180°, or 240° at least four times, and the rotator 210 may be rotated with respect to the electrical angle n (=4) times or less between the time points at which the driving current having the controlled d-axis current Id is applied. In this case, the control period may be set to be repeated at least two times, and thus the driving current having the controlled d-axis current Id may be applied at least a total of eight times while the magnetic force in the motor 200 is controlled.

That is, not by continuously applying the driving current having the controlled d-axis current Id at every application time point 60°, 120°, 180°, or 240° but by applying the driving current at the next time point after the rotator 210 is rotated four times or less with respect to the electrical angle between the application time points, the following driving current may be applied after the increasing or decreasing of the variable magnet is stabilized by the previously applied driving current, and thus the increase or decrease in the magnetic flux may be stably made. Also, by performing control such that the above process is repeated one more time, the magnetic flux of the variable magnet 212 may be definitely increased or decreased.

A specific example to which the control method as described above may be applied will be described as follows.

For example, the control method may be applied to motor control for a device operating at low speed and high torque and at high speed and low torque. As an example, for a motor operating with operating characteristics as shown in FIG. 18, a section that requires an increase of the magnetic flux in a low-speed operation region and a section that requires a decrease of the magnetic flux in a low-speed operation region are set as the speed reference, and a proper magnetic flux corresponding to the speed reference is set as the magnetic flux reference. While the motor 200 is operating at low speed, the speed of the motor 200 and the magnetic flux in the motor may be estimated. When the speed of the motor 200 corresponds to the speed reference, the magnetic force in the motor 200 may be increased by comparing a result of estimating the magnetic flux in the motor 200 to the magnetic flux reference and controlling the driving current applied at the application time point such that the magnetic flux in the motor 200 is increased according to a result of the comparison. While the motor 200 is operating at high speed along with the increase in speed of the motor 200, the speed of the motor 200 and the magnetic flux in the motor 200 may be estimated. When the speed of the motor 200 corresponds to the speed reference, the magnetic force in the motor 200 may be decreased by comparing a result of estimating the magnetic flux in the motor 200 to the magnetic flux reference and controlling the driving current applied at the application time point such that the magnetic flux in the motor 200 is decreased according to a result of the comparison.

By controlling the magnetic force in the motor 200 according to the operating state of the motor 200, it is possible to appropriately operate the motor 200 according to the operating characteristics of the motor 200.

Thus, it is possible to improve the operation of the motor 200 or the operating performance of a device including the motor 200 and also achieve the operation and control of the motor with stability, efficiency, and reliability through an optimized operation.

The embodiments of the motor control module, the motor control device, the motor control system, and the motor control method disclosed herein may be practiced either independently or in conjunction with one another.

The embodiments of the motor control module, the motor control device, the motor control system, and the motor control method disclosed herein may be applied to a motor control module, a motor control device, a motor control system, and a motor control method for controlling a variable magnetic motor in a sensorless control scheme.

The embodiments of the motor control module, the motor control device, the motor control system, and the motor control method disclosed herein may be usefully applied to a control device for controlling the operation/driving of a variable magnetic motor, a driving device, an inverter device, a control method of a control device, a control method of an inverter device, a motor control means and a control method thereof, a control device for controlling an inverter device and a control method thereof, a motor system and a motor control system including the above technical means, and the like.

According to the embodiments of the motor control module, the motor control device, the motor control system, and the motor control method disclosed herein, by applying an increasing/decreasing current for increasing or decreasing a magnetic flux in a motor to the motor at a predetermined application time point depending on the operating state of the motor, it is possible to properly and efficiently increase or decrease magnetic force according to the operating state of the motor.

According to the embodiments of the motor control module, the motor control device, the motor control system, and the motor control method disclosed herein, it is possible to stably and efficiently operate a variable magnetic motor and increase the utility and availability of the motor.

According to the embodiments of the motor control module, the motor control device, the motor control system, and the motor control method disclosed herein, it is possible to accurately and stably control a variable magnetic motor and maintain operating performance thereof.

According to the embodiments of the motor control module, the motor control device, the motor control system, and the motor control method disclosed herein, through the effects as described above, it is possible to overcome the conventional limitations in the art and also expand the availability/applicability and scope of the art.

According to the embodiments of the motor control module, it is possible to expand and improve the performance and functions of a variable magnetic motor, its control technology, or any fields to which such technology is applied.

Although specific embodiments according to the present invention have been described above, it will be appreciated that various modifications can be made without departing from the scope of the invention. Therefore, the scope of the present invention should not be limited to the described embodiments, but should be determined not only by the following claims but also by the equivalents of the claims.

As described above, although the present invention has been described by way of limited embodiments and drawings, the present invention is not limited to the above-described embodiments, which can be variously modified and changed by those skilled in the art. Therefore, all equivalent modifications thereof will fall within the scope of the present invention.

INDUSTRIAL AVAILABILITY

The embodiments of the motor control module, the motor control device, the motor control system, and the motor control method disclosed herein may be applied to a motor control module, a motor control device, a motor control system, and a motor control method for controlling a variable magnetic motor. However, the present invention disclosed herein is not limited thereto and may be usefully applied to a control device for controlling the operation/driving of a variable magnetic motor, a driving device, an inverter device, a control method of a control device, a control method of an inverter device, a motor control means and a control method thereof, a control device for controlling an inverter device and a control method thereof, a motor system and a motor control system including the above technical means, and the like to which the technical spirit of the present invention may be applied.

The invention claimed is:

1. A motor control module for controlling a variable magnetic motor, the motor control module comprising:
a current control unit configured to generate a current command to control a driving current applied to the motor according to an operating state of the motor; and
a signal generation unit configured to generate a control signal to be sent to an inverter to apply a current to the motor according to the current command,
wherein the current control unit is configured to generate the current command to apply an increasing or decreasing current to the motor for increasing or decreasing a magnetic flux in the motor at a predetermined application time point and is configured to control a magnetic force in the motor, and
wherein the current control unit is configured to:
estimate a speed of the motor and the magnetic flux in the motor;
determine whether to increase or decrease the magnetic force in the motor based on the estimation of the speed and magnetic flux of the motor; and
generate the current command according to a result of the determination of whether to increase or decrease the magnetic force in the motor.

2. The motor control module of claim 1,
wherein the motor comprises:
a rotator comprising a plurality of variable magnets; and
a stator to which the increasing or decreasing current is applied to increase or decrease a magnetic flux of the plurality of variable magnets, and
wherein the motor has a structure in which a ratio between a number of the variable magnets of the rotator and a number of slots of the stator is 4:3.

3. The motor control module of claim 1, wherein the application time point is a time point that corresponds to a position of a rotator of the motor.

4. The motor control module of claim 3, wherein the application time point comprises a plurality of application time points, and wherein the plurality of application time points correspond to positions where an electrical angle between the rotator and a stator of the motor is 60°, 120°, 180°, and 240°.

5. The motor control module of claim 1, wherein the current control unit is configured to compare a result of the estimation of the speed and magnetic flux of the motor to a predetermined motor speed and a predetermined magnetic flux and determine whether to increase or decrease the magnetic force depending on a result of the comparison of the estimated speed and the estimated magnetic flux in the motor to the predetermined motor speed and magnetic flux.

6. The motor control module of claim 5, wherein the predetermined motor speed and magnetic flux are criteria that relate to a proper magnetic flux in the motor corresponding to a particular operating speed of the motor.

7. The motor control module of claim 6, wherein the current control unit compares the estimated magnetic flux to the proper magnetic flux corresponding to the estimated speed of the motor and determines whether to increase or decrease the magnetic flux depending on a difference between the estimated magnetic flux and the proper magnetic flux.

8. The motor control module of claim 1, wherein the current control unit is configured to:
generate a current command to increase the magnetic flux in the motor when the current control unit determines that the magnetic force in the motor needs to be increased; and
generate a current command to decrease the magnetic flux in the motor when the current control unit determines that the magnetic force in the motor needs to be decreased.

9. The motor control module of claim 8, wherein the current control unit is configured to:
control a driving current applied to a stator of the motor such that the increasing or decreasing current is applied to the stator; and
increase or decrease a magnetic flux of at least one variable magnet included in a rotator of the motor by using the increasing or decreasing current applied to the stator.

10. The motor control module of claim 9, wherein the current control unit is configured to:
control a d-axis current of the driving current applied to the stator such that the increasing or decreasing current is applied to the stator: and
increase or decrease the magnetic flux of the variable magnet by using the increasing or decreasing current having the controlled d-axis current.

11. The motor control module of claim 10, wherein:
the current control unit is configured to control the d-axis current such that a magnetic flux generated by the increasing or decreasing current is in the same direction as a magnetic flux direction of a permanent magnet included in the rotator when the current control unit increases the magnetic flux of the variable magnet, and
the current control unit is configured to control the d-axis current such that the magnetic flux generated by the increasing or decreasing current is in the opposite direction to the magnetic flux direction of the permanent magnet when the current control unit decreases the magnetic flux of the variable magnet.

12. The motor control module of claim 1, wherein:
the current control unit is configured to generate the current command to apply the increasing or decreasing current to the motor at the application time point, and
the current control unit is configured to generate the current command to apply the increasing or decreasing current to the motor according to a predetermined application condition.

13. The motor control module of claim 12, wherein the application condition is a criterion for an application time or an application period of the increasing or decreasing current.

14. The motor control module of claim 13, wherein the application time is a time corresponding to a magnitude of the increasing or decreasing current for increasing or decreasing the magnetic flux in the motor.

15. The motor control module of claim 14, wherein the application time is set to a time that includes the application time of the increasing or decreasing current and a time during which the application of the increasing or decreasing current is maintained.

16. The motor control module of claim 13, wherein the application period is a time period for when the increasing or decreasing current is applied, the number of times when the increasing or decreasing current is applied, or the number of times the application is repeated.

17. The motor control module of claim 13, wherein:
the application period is a control period during which the increasing or decreasing current is applied according to the application time point at least four times and a rotator of the motor is rotated four times or less with respect to the electrical angle between time points at which the increasing or decreasing current is applied, and
the control period is set to be repeated at least two times.

18. A motor control device for controlling a variable magnetic motor, the motor control device comprising:
an inverter configured to apply a driving current to the motor; and
a control unit configured to control the inverter unit to control the driving current,
wherein the control unit is configured to control a magnetic force in the motor by controlling the driving current such that an increasing or decreasing current for increasing or decreasing a magnetic flux in the motor is applied to the motor at a predetermined application time point,
wherein the control unit is configured to generate the current command to apply the increasing or decreasing current to the motor at the application time point, and
wherein the control unit is configured to generate the current command to apply the increasing or decreasing current to the motor according to a predetermined application condition.

19. A motor control method for controlling a variable magnetic motor, the motor control method comprising the steps of:
estimating a speed of the motor and a magnetic flux in the motor while the motor is in operation;
comparing the magnetic flux in the motor to a predetermined magnetic flux reference and determining whether to increase or decrease the magnetic force in the motor when the speed of the motor reaches a predetermined speed reference; and
controlling a driving current applied to the motor such that the magnetic force in the motor is increased or decreased depending on a result of the determination,
wherein the controlling of the driving current applied to the motor comprises controlling the driving current applied at a predetermined application time point and according to a predetermined application condition to increase or decrease the magnetic flux in the motor.

* * * * *